United States Patent
Teramoto et al.

(10) Patent No.: US 12,500,534 B2
(45) Date of Patent: Dec. 16, 2025

(54) ROTARY MACHINE CONTROL DEVICE

(71) Applicant: Mitsubishi Electric Corporation, Tokyo (JP)

(72) Inventors: Kota Teramoto, Tokyo (JP); Tetsuya Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 164 days.

(21) Appl. No.: 18/576,522

(22) PCT Filed: Aug. 24, 2021

(86) PCT No.: PCT/JP2021/030935
§ 371 (c)(1),
(2) Date: Jan. 4, 2024

(87) PCT Pub. No.: WO2023/026351
PCT Pub. Date: Mar. 2, 2023

(65) Prior Publication Data
US 2024/0333182 A1    Oct. 3, 2024

(51) Int. Cl.
*H02P 6/18* (2016.01)
*H02P 21/14* (2016.01)
(Continued)

(52) U.S. Cl.
CPC ............ *H02P 21/18* (2016.02); *H02P 21/141* (2013.01); *H02P 27/085* (2013.01)

(58) Field of Classification Search
CPC .......... H02P 27/085; H02P 21/18; H02P 6/18; H02P 23/12; H02P 21/141
(Continued)

(56) References Cited

U.S. PATENT DOCUMENTS 6,163,127 A * 12/2000 Patel ..................... B60L 15/025
                                                            318/705
9,172,317 B2 * 10/2015 Ishida ..................... H02P 25/22
(Continued)

FOREIGN PATENT DOCUMENTS

JP          2006230174 A       8/2006

OTHER PUBLICATIONS

International Search Report (PCT/ISA/210) with translation and Written Opinion (PCT/ISA/237) mailed on Oct. 19, 2021, by the Japan Patent Office as the International Searching Authority for International Application No. PCT/JP2021/030935. (9 pages).

*Primary Examiner* — Gabriel Agared
(74) *Attorney, Agent, or Firm* — BUCHANAN, INGERSOLL & ROONEY PC

(57) ABSTRACT

A control device includes: a current detector that detects a stator current flowing between a voltage applicator and a stator winding of a rotary machine; a controller that computes a voltage command value based on the stator current and a rotor position, the voltage command value being a command value of a stator voltage applied to the stator winding; a PWM modulator that generates a gate signal such that a value obtained by smoothing the stator voltage matches the voltage command value, and to use this gate signal to control turning on and off of switching elements provided in the voltage applicator; a voltage integrator that computes a voltage integration value by integrating the gate signal; and a position estimator that estimates the rotor position based on the voltage integration value and the stator current.

12 Claims, 20 Drawing Sheets

(51) Int. Cl.
*H02P 21/18* (2016.01)
*H02P 23/12* (2006.01)
*H02P 27/08* (2006.01)

(58) Field of Classification Search
USPC .......................................................... 318/560
See application file for complete search history.

(56) References Cited

U.S. PATENT DOCUMENTS

2009/0251083 A1* 10/2009 Kinpara .................... H02P 5/74
 318/400.11
2020/0373864 A1* 11/2020 Kojima ................. H02P 25/089
2024/0051598 A1*  2/2024 Tsuchimoto ............ H02P 21/22
2024/0333183 A1* 10/2024 Teramoto ................ H02P 21/22

* cited by examiner

ROTARY MACHINE CONTROL DEVICE

FIELD

The present disclosure relates to a rotary machine control device that controls a rotary machine by obtaining rotor position information without using a position sensor for detecting a rotor position.

BACKGROUND

Driving a rotary machine in such a manner as to deliver sufficient performance of the rotary machine requires information on the position of the rotor. For this reason, a rotary machine is conventionally driven using the position information detected by a position sensor attached to the rotary machine. Meanwhile, for purposes such as further reduction of manufacturing cost of the rotary machine, size reduction of the rotary machine, and improvement in reliability of the rotary machine, technology has recently been developed to drive a rotary machine without use of a position sensor.

One position sensorless control method for a rotary machine is a technique of applying a high-frequency signal to the rotary machine. For this technique, a stator current is first detected upon application of a high-frequency voltage to the rotary machine. Next, a high-frequency current having the same frequency component as the frequency component of the high-frequency voltage is extracted. Finally, the rotor position is estimated utilizing the phenomenon where the inductance of a rotary machine, i.e., the amplitude of the high-frequency current, varies at a frequency twice the electrical angle frequency of the rotor position. Such method using a high-frequency signal has the advantage of excellently estimating the rotor position even when the rotary machine is operating at a zero speed or in a low speed range, but has the disadvantage of occurrence of torque pulsation and noise due to the high-frequency voltage superimposed.

Another technique is also applicable. For example, Patent Literature 1 below discloses a technique for estimating a rotor position from the stator voltage and the stator current of a rotary machine without applying a high-frequency signal. For this technique of Patent Literature 1, first, a stator voltage and a stator current are input to an observer. Next, the observer estimates, from components of the flux linkage, a component rotating in synchronization with the rotor position. Finally, the observer computes the rotor position from the phase of the estimated value, and outputs the thus computed rotor position.

CITATION LIST

Patent Literature

Patent Literature 1: Japanese Patent Application Laid-open No. 2006-230174

SUMMARY OF INVENTION

Problem to be Solved by the Invention

The stator voltage for use in estimation of the rotor position in conventional technologies such as the technology of Patent Literature 1 is not an actual voltage, but a voltage command value that is a command value of the voltage. The use of the voltage command value unavoidably causes an error. The actual stator voltage, which is in a rectangular waveform, is applied to the rotary machine such that a value generated by smoothing this stator voltage is a voltage command value. For conventional technologies, an error in the estimated value of the rotor position occurs due to that voltage error, which in some case causes a pulsation component. When a rotary machine is controlled using an estimated value of the rotor position including such estimation error, pulsation may occur in torque or power, which adversely affects a mechanical system or a power system connected thereto.

The present disclosure has been made in view of the foregoing, and it is an object of the present disclosure to provide a rotary machine control device capable of reducing torque pulsation and power pulsation resulting from an estimation error that may be included in an estimated value of the rotor position.

Means to Solve the Problem

To solve the problem and achieve the object described above, a rotary machine control device according to the present disclosure comprises a voltage applicator, a current detector, a controller, a pulse width modulator, a voltage integrator, and a position estimator. The voltage applicator is connected between a direct current power supply and a rotary machine to apply a stator voltage of a rectangular waveform to the rotary machine by switching on and off a plurality of switching elements provided for each phase. The current detector detects a stator current flowing between the voltage applicator and a stator winding of the rotary machine. The controller computes a voltage command value on the basis of the stator current and a rotor position, the voltage command value being a command value of the stator voltage, the stator voltage being a voltage applied to the stator winding, the rotor position being information on a position of a rotor of the rotary machine. The pulse width modulator generates a gate signal such that a value obtained by smoothing the stator voltage matches the voltage command value, and uses the gate signal to control turning on and off each of the switching elements. The voltage integrator computes a voltage integration value by integrating the gate signal, the voltage integration value being an integrated value of the stator voltage. The position estimator estimates the rotor position on the basis of the voltage integration value and the stator current.

Effects of the Invention

The rotary machine control device according to the present disclosure provides the advantage of reducing the torque pulsation and power pulsation resulting from the estimation error that may be included in the estimated value of the rotor position.

DESCRIPTION OF EMBODIMENTS

A rotary machine control device according to embodiments of the present disclosure will be described in detail below with reference to the accompanying drawings.

First Embodiment

Figure 1:
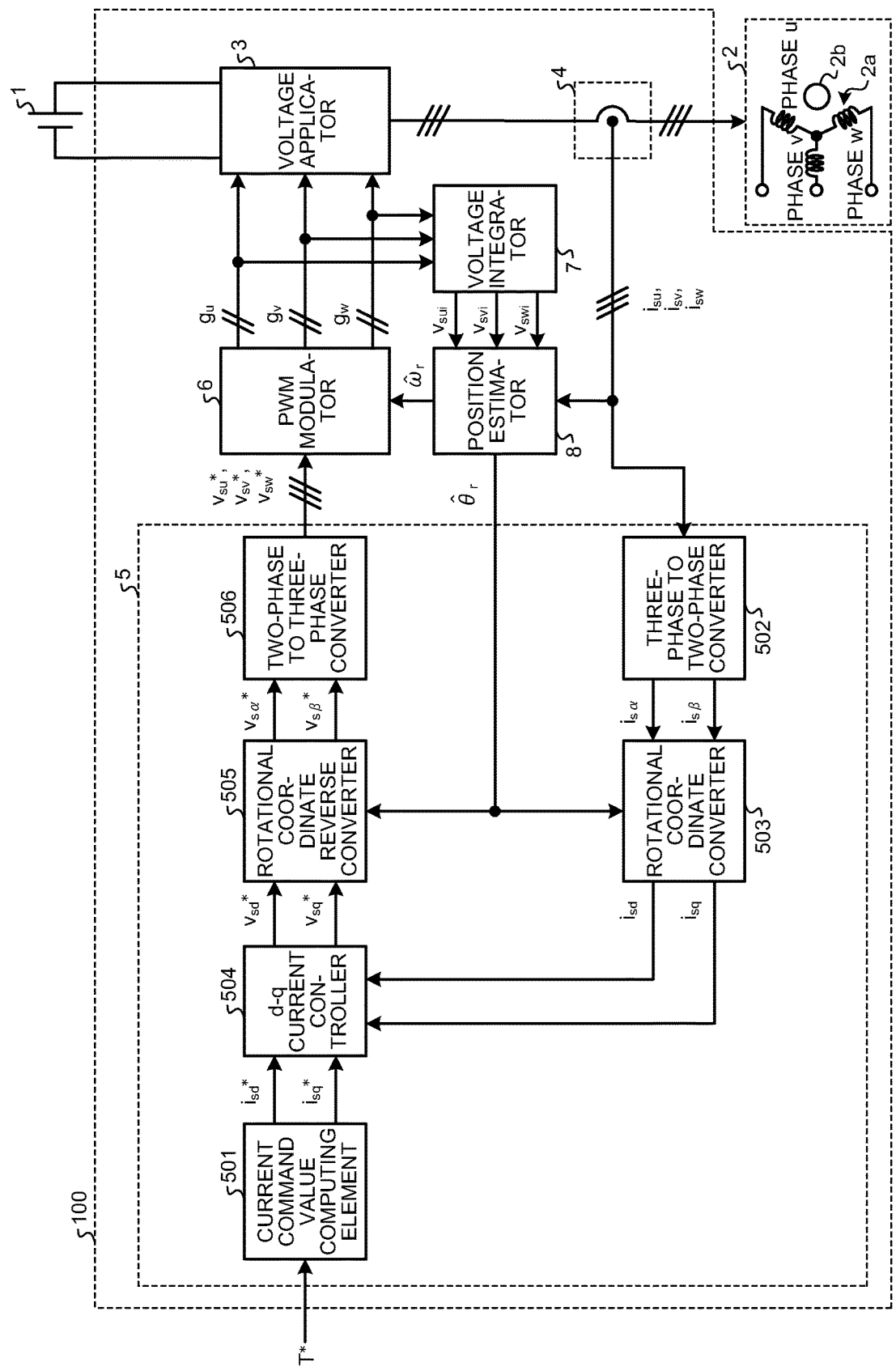
FIG. 1 is a diagram illustrating an example configuration of a rotary machine control device according to a first embodiment.

FIG. 1 is a diagram illustrating an example configuration of a rotary machine control device (hereinafter referred to simply as "control device" as appropriate) 100 according to a first embodiment. The control device 100 according to the first embodiment is configured to include a voltage applicator 3, a current detector 4, a controller 5, a PWM modulator 6, a voltage integrator 7, and a position estimator 8.

The voltage applicator 3 is connected between a direct current (DC) power supply 1 and a rotary machine 2. The DC power supply 1 is a power supply source that provides drive power for the rotary machine 2.

The rotary machine 2 is a three-phase electric motor having inductance varying with the rotor position. The rotary machine 2 includes a stator $2a$ and a rotor $2b$ disposed inside the stator $2a$. The stator $2a$ includes stator windings of phase u, phase v, and phase w. The rotary machine 2 also functions as a three-phase power generator depending on the operation mode. A synchronous reluctance motor is herein described as being an example of the rotary machine 2, but the rotary machine 2 can be a motor other than a synchronous reluctance motor. Note that the orientation of the rotor $2b$ that maximizes the inductance is herein defined as d-axis, and the orientation of the rotor $2b$ that minimizes the inductance is herein defined as q-axis. The rotor position is given with respect to the d-axis.

The current detector 4 is disposed between the DC power supply 1 and the rotary machine 2. The current detector 4 detects stator currents $i_{su}$, $i_{sv}$, and $i_{sw}$. The stator currents $i_{su}$, $i_{sv}$, and $i_{sw}$ flow between the voltage applicator 3 and the stator windings of the rotary machine 2.

The voltage applicator 3 switches on and off multiple switching elements provided for each phase to thereby apply a stator voltage of a rectangular waveform to the rotary machine 2. The stator voltage is a voltage applied to each of the stator windings of the rotary machine 2. The voltage applicator 3 is herein described as being a three-phase inverter.

The controller 5 computes voltage command values $v_{su}^*$, $v_{sv}^*$, and $v_{sw}^*$ on the basis of the rotor position and the stator currents $i_{su}$, $i_{sv}$, and $i_{sw}$ detected by the current detector 4. The rotor position is information on the position of the rotor $2b$. The voltage command values $v_{su}^*$, $v_{sv}^*$, and $v_{sw}^*$ are command values of the stator voltages for driving the rotary machine 2. The stator voltages output by the voltage applicator 3 are controlled through the voltage command values $v_{su}^*$, $v_{sv}^*$, and $v_{sw}^*$.

The PWM modulator 6 generates gate signals $g_u$, $g_v$, and $g_w$ such that values obtained by smoothing the stator voltages each having a rectangular waveform output by the voltage applicator 3 match the voltage command values $v_{su}^*$, $v_{sv}^*$, and $v_{sw}^*$, and uses these gate signals $g_u$, $g_v$, and $g_w$ to control turning on and off each of the switching elements.

The voltage integrator 7 integrates the gate signals $g_u$, $g_v$, and $g_w$ to thereby compute voltage integration values $v_{sui}$, $v_{svi}$, and $v_{swi}$. The voltage integration values $v_{sui}$, $v_{svi}$, and $v_{swi}$ are integrated values of the stator voltages.

The position estimator 8 computes an estimated rotor position $\hat{\theta}_r$ on the basis of the voltage integration values $v_{sui}$, $v_{svi}$, and $v_{swi}$ and the stator currents $i_{su}$, $i_{sv}$, and $i_{sw}$. The estimated rotor position $\hat{\theta}_r$ is an estimated value of the rotor position, the rotor position being information on the position of the rotor $2b$. Note that the estimated rotor position $\hat{\theta}_r$ is herein given by a value converted into an electrical angle.

Figure 2:
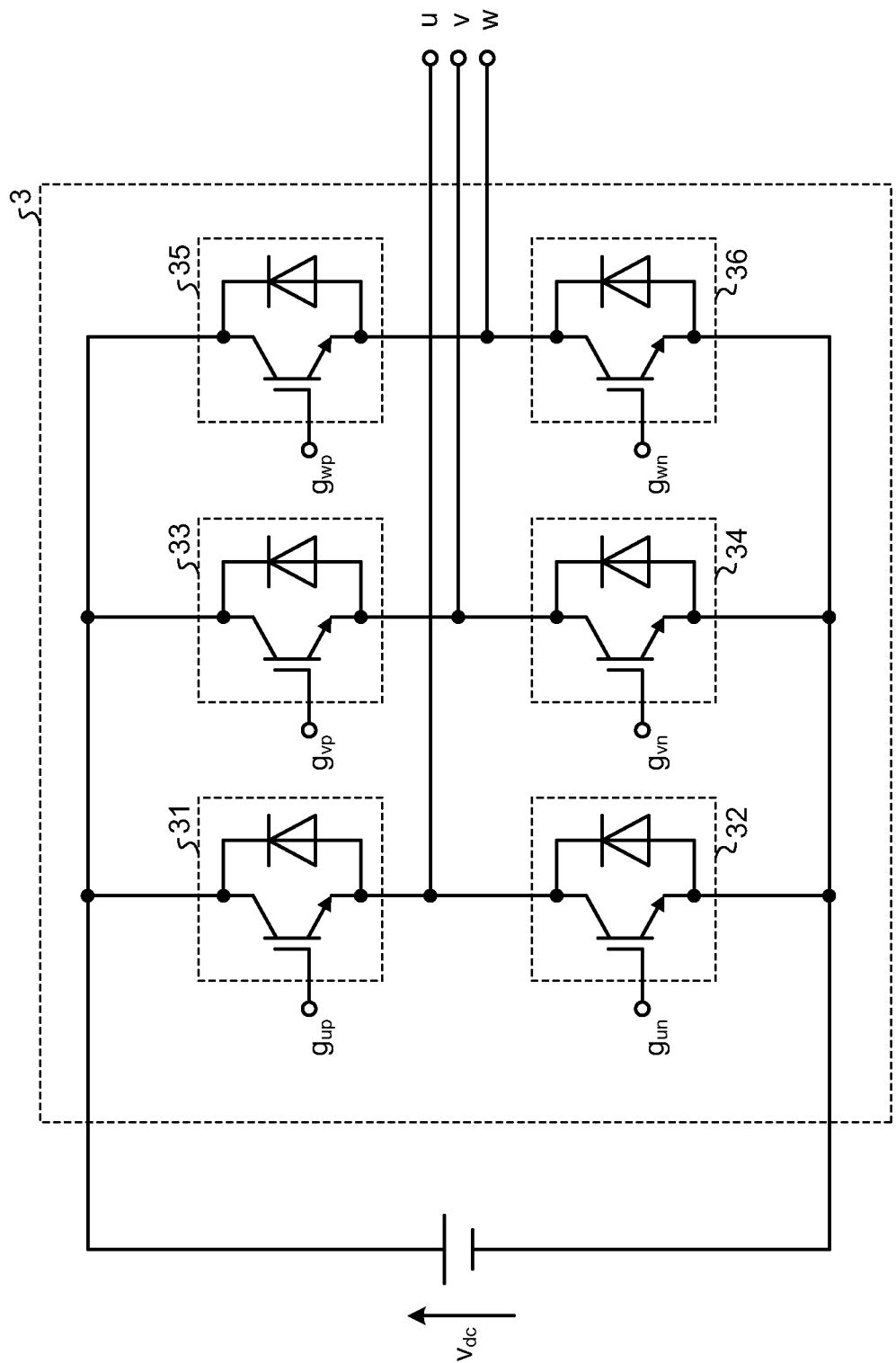
FIG. 2 is a diagram illustrating an example configuration of a main circuit of a three-phase inverter, utilized as the voltage applicator of FIG. 1.

FIG. 2 is a diagram illustrating an example configuration of a main circuit of the three-phase inverter used as the voltage applicator 3 of FIG. 1. In FIG. 2, a switching element 31 is the switching element on the positive side of phase u, and a switching element 32 is the switching element on the negative side of phase u. Similarly, switching elements 33 and 34 are respectively the switching elements on the positive and negative sides of phase v, and switching elements 35 and 36 are respectively the switching elements on the positive and negative sides of phase w. An example of each of the switching elements 31 to 36 is the insulated gate bipolar transistor (IGBT) in the illustration, but a switching element other than an IGBT can also be used. An example of switching element other than an IGBT is a metal oxide semiconductor field effect transistor (MOSFET). A diode is connected to both ends of each switching element in inverse parallel. The term "inverse parallel" refers to a connection form in which the anode of a diode is connected to the emitter of an IGBT while the cathode of the diode is connected to the collector of the IGBT.

An operation of the controller 5 will next be specifically described. The controller 5 is configured to include a current command value computing element 501, a three-phase to two-phase converter 502, a rotational coordinate converter 503, a d-q current controller 504, a rotational coordinate reverse converter 505, and a two-phase to three-phase converter 506. The controller 5 receives a torque command value T*. The controller 5 computes the voltage command values $v_{su}^*$, $v_{sv}^*$, and $v_{sw}^*$ such that the rotary machine 2 outputs a torque corresponding to the torque command value T*.

The current command value computing element 501 computes current command values $i_{sd}^*$ and $i_{sq}^*$. The current command values $i_{sd}^*$ and $i_{sq}^*$ are each a command value of the stator current necessary for the rotary machine 2 to output a torque corresponding to the torque command value T*. The current command values $i_{sd}^*$ and $i_{sq}^*$ are each a computed value in a rotational coordinate system that rotates in synchronization with the rotational speed of the rotary machine 2. Note that the current command values $i_{sd}^*$ and $i_{sq}^*$ are computed to minimize the current root-mean-square (RMS) value for that torque. That is, the current command values $i_{sd}^*$ and $i_{sq}^*$ are computed to minimize copper loss of the rotary machine 2 for that torque.

The three-phase to two-phase converter 502 converts, by three-phase to two-phase conversion, the stator currents $i_{su}$, $i_{sv}$, and $i_{sw}$ in a three-phase coordinate system into stator currents $i_{s\alpha}$ and $i_{s\beta}$ in a two-phase coordinate system. The two-phase coordinate system that is a static coordinate system. Note that this conversion process is herein performed using a transformation matrix $C_{32}$ shown in Equation (1) below.

Formula 1

$$\begin{bmatrix} i_{s\alpha} \\ i_{s\beta} \end{bmatrix} = \sqrt{\frac{2}{3}} \underbrace{\begin{bmatrix} 1 & -\frac{1}{2} & -\frac{1}{2} \\ 0 & \frac{\sqrt{3}}{2} & -\frac{\sqrt{3}}{2} \end{bmatrix}}_{C_{32}} \begin{bmatrix} i_{su} \\ i_{sv} \\ i_{sw} \end{bmatrix} \quad (1)$$

The rotational coordinate converter 503 converts the stator currents $i_{s\alpha}$ and $i_{s\beta}$ in the two-phase coordinate system into stator currents $i_{sd}$ and $i_{sq}$ in a rotational coordinate system, by rotational coordinate conversion using the estimated rotor position $\hat{\theta}_r$. Note that this conversion process is herein performed using a transformation matrix $C_{dq}(\hat{\theta}_r)$ shown in Equation (2) below.

Formula 2

$$\begin{bmatrix} i_{sd} \\ i_{sq} \end{bmatrix} = \underbrace{\begin{bmatrix} \cos\hat{\theta}_r & \sin\hat{\theta}_r \\ -\sin\hat{\theta}_r & \cos\hat{\theta}_r \end{bmatrix}}_{C_{dq}(\hat{\theta}_r)} \begin{bmatrix} i_{s\alpha} \\ i_{s\beta} \end{bmatrix} \quad (2)$$

The d-q current controller 504 provides control such that the stator currents $i_{sd}$ and $i_{sq}$ match the current command values $i_{sd}^*$ and $i_{sq}^*$, and computes voltage command values $v_{sd}^*$ and $v_{sq}^*$ in the rotational coordinate system. This control can be made using proportional-integral control. Note that control other than proportional-integral control can be used.

The rotational coordinate reverse converter 505 uses the estimated rotor position $\hat{\theta}_r$ to convert the voltage command values $v_{sd}^*$ and $v_{sq}^*$ in the rotational coordinate system into voltage command values $v_{s\alpha}^*$ and $v_{s\beta}^*$ in the two-phase coordinate system by rotational coordinate inverse conversion. Note that this inverse conversion process is herein performed using an inverse transformation matrix $C_{dq}^{-1}(\hat{\theta}_r)$ shown in Equation (3) below.

Formula 3

$$\begin{bmatrix} v_{s\alpha}^* \\ v_{s\beta}^* \end{bmatrix} = \underbrace{\begin{bmatrix} \cos\hat{\theta}_r & -\sin\hat{\theta}_r \\ \sin\hat{\theta}_r & \cos\hat{\theta}_r \end{bmatrix}}_{C_{dq}^{-1}(\hat{\theta}_r)} \begin{bmatrix} v_{sd}^* \\ v_{sq}^* \end{bmatrix} \quad (3)$$

The two-phase to three-phase converter 506 converts the voltage command values $v_{s\alpha}^*$ and $v_{s\beta}^*$ in the two-phase coordinate system into the voltage command values $v_{su}^*$, $v_{sv}^*$, and $v_{sw}^*$ in the three-phase coordinate system by two-phase to three-phase conversion. Note that this conversion process is herein performed using a transformation matrix $C_{23}$ shown in Equation (4) below.

Formula 4

$$\begin{bmatrix} v_{su}^* \\ v_{sv}^* \\ v_{sw}^* \end{bmatrix} = \sqrt{\frac{2}{3}} \underbrace{\begin{bmatrix} 1 & 0 \\ -\frac{1}{2} & \frac{\sqrt{3}}{2} \\ -\frac{1}{2} & -\frac{\sqrt{3}}{2} \end{bmatrix}}_{C_{23}} \begin{bmatrix} v_{s\alpha}^* \\ v_{s\beta}^* \end{bmatrix} \quad (4)$$

Figure 3:
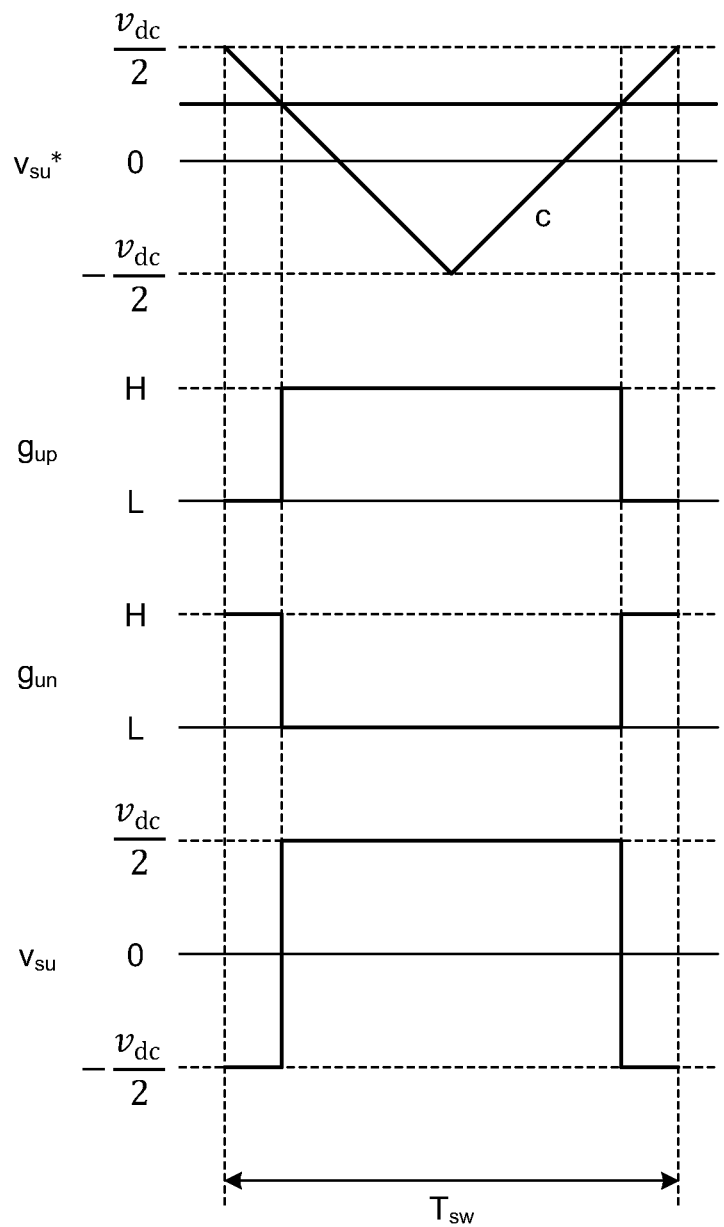
FIG. 3 is a first diagram for describing operation of the pulse width modulator (PWM modulator) illustrated in FIG. 1.

FIG. 3 is a first diagram for describing operation of the PWM modulator 6 illustrated in FIG. 1. FIG. 3 illustrates a waveform of phase u as an example waveform of one of the three phases.

In FIG. 3, the top portion illustrates a waveform of the phase-u voltage command value $v_{su}^*$, and a waveform of a carrier signal "c". The phase-u voltage command value $v_{su}^*$ is the voltage command value of phase u, and the carrier signal "c" is a triangular wave. The upper middle portion illustrates a waveform of a phase-u upper gate signal $g_{up}$. The phase-u upper gate signal $g_{up}$ is the gate signal on the upper side of phase u. The lower middle portion illustrates a waveform of a phase-u lower gate signal $g_{un}$. The phase-u lower gate signal $g_{un}$ is the gate signal on the lower side of phase u. The bottom portion illustrates a waveform of a phase-u voltage $v_{su}$. The phase-u voltage $v_{su}$ is the stator voltage of phase u. The voltage $v_{dc}$, which is the supply voltage, is the voltage of the DC power supply 1. In this case, as illustrated in FIG. 3, a voltage of $v_{dc}/2$, i.e., half the supply voltage $v_{dc}$, is the step width of a phase voltage. The phase-u voltage command value $v_{su}^*$ and the phase-u voltage $v_{su}$ vary within a range of $\pm v_{dc}/2$.

The PWM modulator 6 compares the phase-u voltage command value $v_{su}^*$ with the carrier signal c. When the phase-u voltage command value $v_{su}^*$ is greater than the value of the carrier signal c, the PWM modulator 6 sets the phase-u upper gate signal $g_{up}$ to H-level, and sets the phase-u lower gate signal $g_{un}$ to L-level. Alternatively, when the phase-u voltage command value $v_{su}^*$ is lower than or equal to the value of the carrier signal c, the PWM modulator 6 sets the phase-u upper gate signal $g_{up}$ to L-level, and sets the phase-u lower gate signal $g_{un}$ to H-level. In this respect, H represents "High" and L represents "Low". When the phase-u upper gate signal $g_{up}$=H and the phase-u lower gate signal $g_{un}$=L, the PWM modulator 6 turns on the switching element 31 on the positive side of phase u, and turns off the switching element 32 on the negative side of phase u, in the voltage applicator 3. Alternatively, when the phase-u upper gate signal $g_{up}$=L and the phase-u lower gate signal $g_{un}$=H, the PWM modulator 6 turns off the switching element 31 on the positive side of phase u, and turns on the switching element 32 on the negative side of phase u, in the voltage applicator 3. Operations for phase v and for phase w are similar to the operation for phase u.

The phase-u voltage $v_{su}$ actually output is a voltage value that is an average phase-u voltage command value $v_{su}^*$ over a switching period $T_{sw}$. Note that the switching period $T_{sw}$ is equal to the carrier period, i.e., the period of the carrier signal c. In the case of switching on and off switching elements on the positive and negative sides, a dead time, during which the switching elements on both of these sides are in off states, is set in general to prevent those switching elements from becoming ON states simultaneously. However, FIG. 3 omits illustration of such a dead time. In addition, for simplicity of illustration, the neutral point voltage, which is the average value of the three-phase voltage, is not illustrated in the waveform of the phase-u voltage $v_{su}$ illustrated in FIG. 3.

The first embodiment employs a technique of synchronizing a switching frequency $f_{sw}$ with an integer multiple of a fundamental wave frequency $f_s$ of the rotational speed of the rotary machine 2. The switching frequency $f_{sw}$ is the reciprocal of the switching period $T_{sw}$. This synchronization technique reduces a low-order harmonic component even when the switching frequency $f_{sw}$ is not sufficiently higher than the fundamental wave frequency $f_s$. This enables supplying the rotary machine 2 with a stator voltage having low distortion and a stator current having low distortion. Note that the switching frequency $f_{sw}$ not sufficiently high refers to, for example, the switching frequency $f_{sw}$ in the range from the fundamental wave frequency $f_s$ to 15 times the fundamental wave frequency $f_s$.

Figure 4:
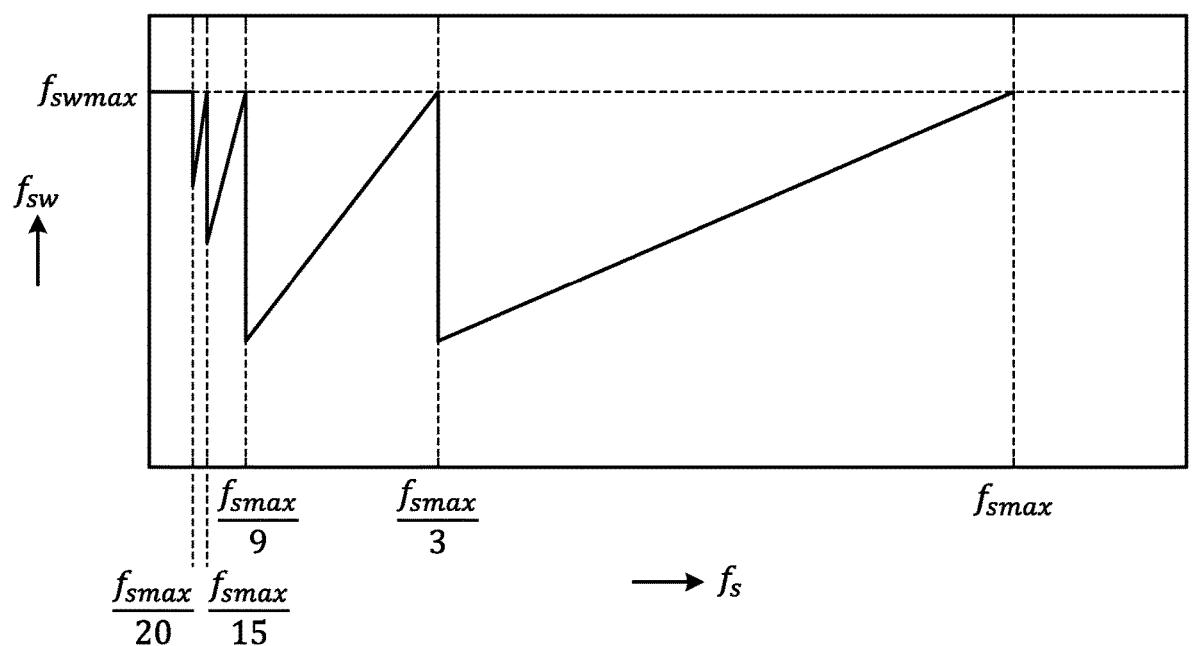
FIG. 4 is a second diagram for describing operation of the PWM modulator illustrated in FIG. 1.

FIG. 4 is a second diagram for describing operation of the PWM modulator 6 illustrated in FIG. 1. FIG. 4 illustrates a relationship between the fundamental wave frequency $f_s$ and the switching frequency $f_{sw}$. As illustrated in FIG. 4, the switching frequency $f_{sw}$ is varied depending on the fundamental wave frequency $f_s$. The frequency $f_{smax}$ is the maximum fundamental wave frequency. The frequency $f_{swmax}$ is the maximum switching frequency. The example illustrated in FIG. 4 is where: the switching frequency $f_{sw}$ is 15 times the fundamental wave frequency $f_s$ when the fundamental wave frequency $f_s$ exceeds $f_{smax}/20$ but is not more than $f_{smax}/15$; and nine times the fundamental wave frequency $f_s$ when the fundamental wave frequency $f_s$ exceeds $f_{smax}/15$ but is not more than $f_{smax}/9$. In addition, the switching frequency $f_{sw}$ is three times the fundamental wave frequency $f_s$ when the fundamental wave frequency $f_s$ exceeds $f_{smax}/9$ but is not more than $f_{smax}/3$; and the switching frequency $f_{sw}$ is equal to the fundamental wave frequency $f_s$ when the fundamental wave frequency $f_s$ is higher than $f_{smax}/3$. Note that the frequency $f_{swmax}$ is simply used when the fundamental wave frequency $f_s$ is less than or equal to $f_{smax}/20$. In addition, assuming that a carrier signal common to the three phases is used, the switching frequency $f_{sw}$ is one, three, nine, or 15 times the fundamental wave frequency.

Figure 5:
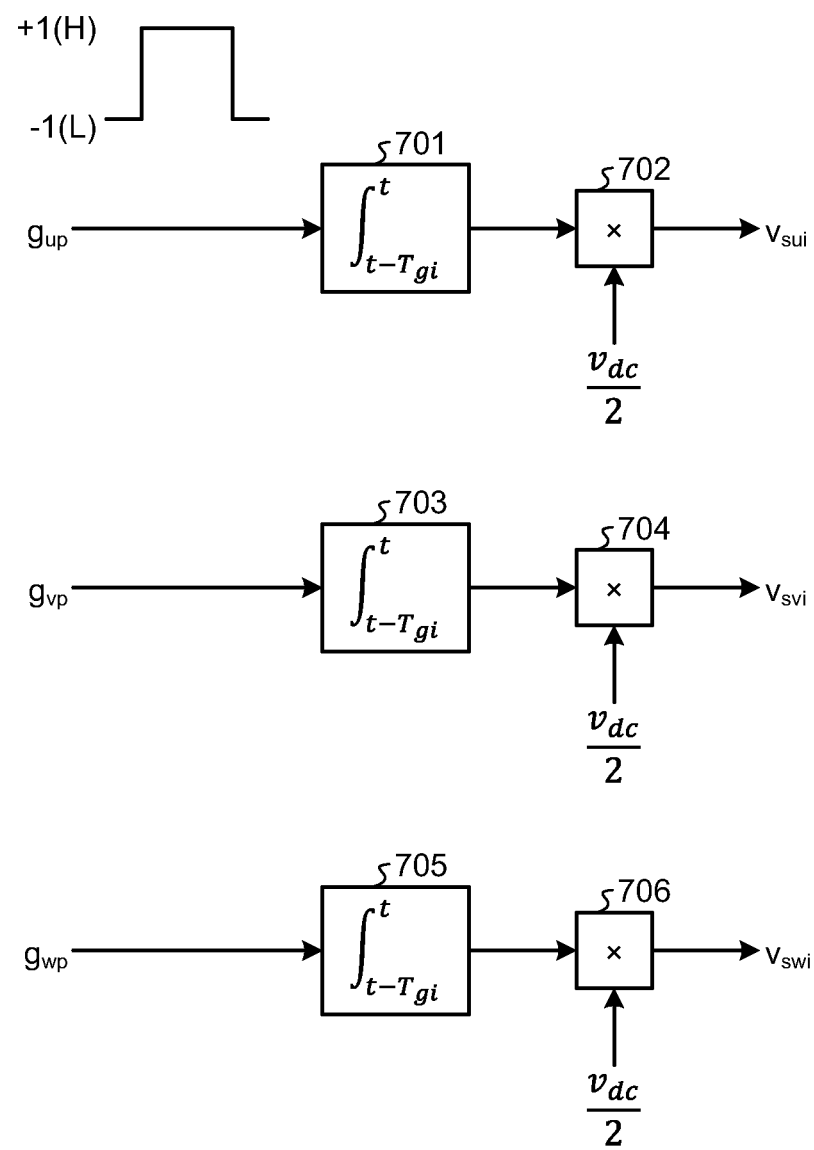
FIG. 5 is a diagram illustrating an example configuration of the voltage integrator illustrated in FIG. 1.

FIG. 5 is a diagram illustrating an example configuration of the voltage integrator 7 illustrated in FIG. 1. FIG. 5 illustrates a configuration including integrators 701, 703, and 705, and multipliers 702, 704, and 706. As one of a positive-side gate signal and a negative-side gate signal is an inverted signal of the other, FIG. 5 illustrates only components relating to the positive-side gate signals.

An operation for phase u will first be described. The positive-side gate signal $g_{up}$ is input to the integrator 701. The integrator 701 integrates the positive-side gate signal $g_{up}$, taking a high level H as +1 and a low level L as −1. An integration time, which is the time period for performing integration, is a time period from a time earlier than the current time "t" by $T_{gi}$ to the current time "t". After integration of the gate signal, the multiplier 702 multiplies the integrated value from the integrator 701 by $v_{dc}/2$, i.e., a half of the supply voltage $v_{dc}$, and outputs the product as the phase-u voltage integration value $v_{sui}$. This enables computing an integrated value of the instantaneous value of the phase-u voltage $v_{su}$ of a rectangular waveform. The integrators 703 and 705 and the multipliers 704 and 706 perform similar operations for the other phases, i.e., for phase v and phase w. As a result, the phase-v voltage integration value $v_{svi}$ is output from the multiplier 704, and the phase-w voltage integration value $v_{swi}$ is output from the multiplier 706. Note that these voltage integration values $v_{sui}$, $v_{svi}$, and $v_{swi}$ for their respective phases will be designated as voltage integration value $v_{sxi}$ when these values are not distinguished by phase.

As the voltage integration value is a computed integral of the instantaneous value of the stator voltage $v_s$ of a rectangular waveform, the voltage integration value $v_{sxi}$ is computed at a computation frequency set to a value sufficiently higher than the switching frequency $f_{sw}$ of the gate signal generated by the PWM modulator 6. In order that the computation frequency is sufficiently high, the computation frequency is preferably 25 or more times the switching frequency $f_{sw}$, and more preferably 100 or more times the switching frequency $f_{sw}$. In addition, a burden of this integration operation itself is small. Even with a high computation frequency, thus, a computing device bears a small computation burden as compared to the amount of calculation necessary to control the rotary machine 2. The value of the supply voltage $v_{dc}$ for use in this operation can be a detection value, a rated value, or an expected value during use.

A principle for the position estimator 8 to estimate the rotor position and the rotational speed will next be described. A rotary machine model that formulates characteristics of the rotary machine 2 is expressed by Equations (5) and (6) below in a two-phase coordinate system.

Formula 5

$$v_s^{\alpha\beta} = R_s i_s^{\alpha\beta} + \frac{d}{dt}\psi_s^{\alpha\beta} \qquad (5)$$

Formula 6

$$\psi_s^{\alpha\beta} = \begin{bmatrix} L_{savg} + L_{svar}\cos(2\theta_r) & L_{svar}\sin(2\theta_r) \\ L_{svar}\sin(2\theta_r) & L_{savg} - L_{svar}\cos(2\theta_r) \end{bmatrix} i_s^{\alpha\beta} \qquad (6)$$

In the equations above, $v_s^{\alpha\beta}$ is the stator voltage, $i_s^{\alpha\beta}$ is the stator current, $\psi_s^{\alpha\beta}$ is the flux linkage, and $R_s$ is the winding resistance. The superscript "$\alpha\beta$" indicates that the value is a value in a two-phase coordinate system.

In addition, the inductance of the rotary machine 2 varies depending on the rotor position. Equation (6) above is expressed using an inductance averaged component $L_{savg}$ and an inductance variable component $L_{svar}$, the inductance averaged component $L_{savg}$ representing an inductance component invariable regardless of the rotor position, the inductance variable component $L_{svar}$ representing an inductance component that varies at a frequency twice the electrical angle frequency of the rotor position. Such inductance averaged component $L_{savg}$ and inductance variable component $L_{svar}$ are expressed by Equations (7) and (8) below using inductance $L_{sd}$ in the d-axis direction and inductance $L_{sq}$ in the q-axis direction.

Formula 7

$$L_{savg} = \frac{L_{sd} + L_{sq}}{2} \quad (7)$$

Formula 8

$$L_{svar} = \frac{L_{sd} - L_{sq}}{2} \quad (8)$$

According to the rotary machine model expressed by Expressions (5) and (6) above, a product of the inductance $L_{sq}$ in the q-axis direction and the stator current $i_s^{\alpha\beta}$ is subtracted from the flux linkage $\psi_s^{\alpha\beta}$ to thereby extract a d-axis-based active flux $\psi_{afd}^{\alpha\beta}$, as shown by Equation (9) below.

Formula 9

$$\psi_{afd}^{\alpha\beta} = \psi_s^{\alpha\beta} - L_{sq} i_s^{\alpha\beta} \quad (9)$$

The d-axis-based active flux $\psi_{afd}^{\alpha\beta}$, which is a component of the flux linkage $\psi_s^{\alpha\beta}$, rotates in synchronization with the rotor position.

In addition, the stator current $i_s^{\alpha\beta}$ can be expressed by Equation (10) below using the current RMS value $I_{ph}$ thereof and a conduction angle $\varphi_i$, which is the angular difference from the rotor position.

Formula 10

$$i_s^{\alpha\beta} = \sqrt{3} I_{ph} \begin{bmatrix} \cos(\theta_r + \phi_i) \\ \sin(\theta_r + \phi_i) \end{bmatrix} \quad (10)$$

Substitution of Expressions (6) and (10) above into the right-hand side of Equation (9) above results in Equation (11) below, Equation (11) expressing the d-axis-based active flux $\psi_{afd}^{\alpha\beta}$ in the two-phase coordinate system.

Formula 11

$$\psi_{afd}^{\alpha\beta} = \underbrace{2L_{svar}\sqrt{3} I_{ph}\cos\varphi_i}_{(L_{sd}-L_{sq})i_{sd}} \begin{bmatrix} \cos\theta_r \\ \sin\theta_r \end{bmatrix} \quad (11)$$

As shown by Equation (11) above, the active flux $\psi_{afd}^{\alpha\beta}$ is a component produced by multiplication of the inductance variable component $L_{svar}$ by the stator current $i_{sd}$. In addition, since the active flux $\psi_{afd}^{\alpha\beta}$ of Equation (11) above is based on the d-axis direction, the rotor position can be estimated by inputting this to a publicly known observer.

Note that instead of Equation (9) above, a q-axis-based active flux $\psi_{afq}^{\alpha\beta}$ expressed by Equation (12) below can also be used. The q-axis-based active flux $\psi_{afq}^{\alpha\beta}$ is a component obtained by subtracting a product of the inductance $L_{sd}$ in the d-axis direction and the stator current $i_s^{\alpha\beta}$ from the flux linkage $\psi_s^{\alpha\beta}$.

Formula 12

$$\psi_{afq}^{\alpha\beta} = \psi_s^{\alpha\beta} - L_{sd} i_s^{\alpha\beta} \quad (12)$$

As in the d-axis base, substitution of Expressions (6) and (10) above into the right-hand side of Equation (12) above results in Equation (13) below, Equation (13) expressing the q-axis-based active flux $\psi_{afq}^{\alpha\beta}$ in the two-phase coordinate system.

Formula 13

$$\psi_{afq}^{\alpha\beta} = \underbrace{-2L_{mac}\sqrt{3} I_{ph}\sin\varphi_i}_{(L_{sq}-L_{sd})i_{sq}} \begin{bmatrix} -\sin\theta_r \\ \cos\theta_r \end{bmatrix} \quad (13)$$

Since the q-axis-based active flux $\psi_{afq}^{\alpha\beta}$ expressed by Equation (13) above is based on the q-axis direction, the rotor position can be estimated by inputting this to a publicly known observer.

In the present embodiment, the d-axis-based active flux $\psi_{afd}^{\alpha\beta}$ is input to the observer disclosed in foregoing Patent Literature 1 to thereby estimate the rotor position. Note that the rotor position can be estimated using an element other than the observer disclosed in Patent Literature 1.

The observer expressed by Equation (14) in Patent Literature 1 can be expressed by Equation (14) below using parameters used herein.

Formula 14

$$s\hat{\psi}_{safd}^{dq} = \quad (14)$$
$$G\left\{ v_s^{dq} - R_s i_s^{dq} - (sI + \omega_s J)L_{sq} i_s^{dq} - \omega_r J\hat{\psi}_{safd}^{dq} \right\} + (\omega_r - \omega_s) J\hat{\psi}_{safd}^{dq}$$

In Equation (14) above, $\hat{\psi}_{safd}^{dq}$ is an estimated value of the d-axis-based active flux. This observer is expressed in a rotational coordinate system synchronized with the estimated rotor position. The superscript "dq" indicates that the value is a value in the rotational coordinate system. In addition, $\omega_r$ in Equation (14) above represents the rotational angular velocity, and @s represents the rotational angular velocity in the rotational coordinate system. Moreover, the symbol J in Equation (14) above is a transformation matrix expressed by Equation (15) below.

Formula 15

$$J = \begin{bmatrix} 0 & -1 \\ 1 & 0 \end{bmatrix} \quad (15)$$

Setting an observer gain in the observer expressed by Equation (14) above in accordance with the teachings of Patent Literature 1 obtains an estimated value of the d-axis-based active flux $\psi_{afd}^{\alpha\beta}$. In addition, since the d-axis-based active flux $\psi_{afd}^{\alpha\beta}$ is synchronized with the rotor position $\theta_r$, as shown by Equation (11) above, computation of arc tangent of the two components in Equation (11) above estimates the rotor position.

Moreover, both sides of Equation (14) above is divided by "s" to thereby obtain Equation (16) below.

Formula 16

$$\hat{\psi}_{safd}^{dq} = G\frac{1}{s}\left\{v_s^{dq} - R_s i_s^{dq} - (sI + \omega_s J)L_{sq} i_s^{dq} - \omega_r J\hat{\psi}_{safd}^{dq}\right\} + \frac{1}{s}(\omega_r - \omega_s)J\hat{\psi}_{safd}^{dq}$$
(16)

Note that Equation (14) above, which is an equation expressed using an observer, is basically expressed integrating a term including the stator voltage $v_s^{dq}$ and the stator current $i_s^{dq}$. In addition, the first term on the right-hand side of Equation (16) that is a modified Equation (14) above is an integral value of the stator voltage $v_s^{dq}$. In view of this, the first embodiment uses, for this part, the voltage integration value $v_{sxi}$ computed by the voltage integrator 7. Note that the conventional technology described in Patent Literature 1 uses a voltage command value $v_s^{dq*}$ as the stator voltage $v_s^{dq}$.

Figure 6:
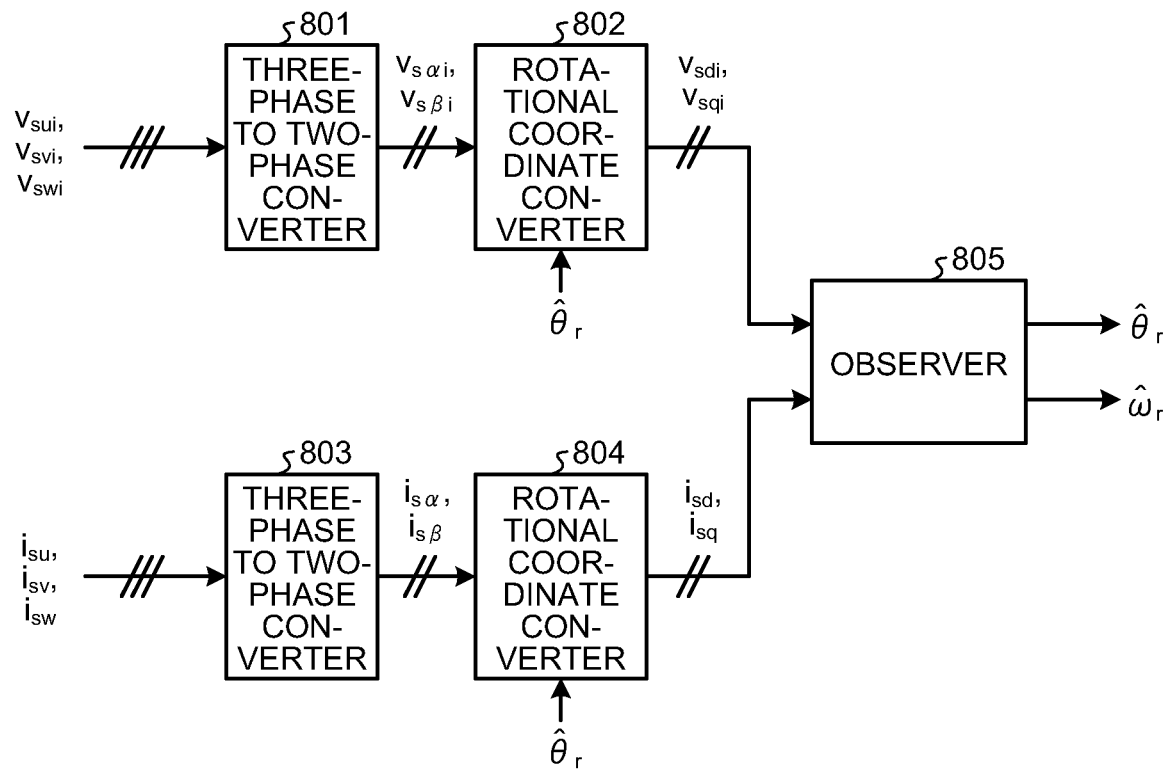
FIG. 6 is a diagram illustrating an example configuration of the position estimator illustrated in FIG. 1.

FIG. 6 is a diagram illustrating an example configuration of the position estimator 8 illustrated in FIG. 1. The position estimator 8 can be configured to include three-phase to two-phase converters 801 and 803, rotational coordinate converters 802 and 804, and an observer 805.

The three-phase to two-phase converter 801 converts the voltage integration values $v_{sui}$, $v_{svi}$, and $v_{swi}$ output from the voltage integrator 7, into voltage integration values $v_{s\alpha i}$ and $v_{s\beta i}$ in the two-phase coordinate system by three-phase to two-phase conversion. The rotational coordinate converter 802 converts the voltage integration values $v_{s\alpha i}$ and $v_{s\beta i}$ in the two-phase coordinate system, into voltage integration values $v_{sdi}$ and $v_{sqi}$ in the rotational coordinate system by rotational coordinate conversion using the estimated rotor position $\hat{\theta}_r$. Note that the estimated rotor position $\hat{\theta}_r$ is feedback of an output of the observer 805, i.e., feedback of the estimated rotor position $\hat{\theta}_r$ that is an output of the position estimator 8.

In addition, the three-phase to two-phase converter 803 converts the stator currents $i_{su}$, $i_{sv}$, and $i_{sw}$ in the three-phase coordinate system, into the stator currents $i_{s\alpha}$ and $i_{s\beta}$ in the two-phase coordinate system by three-phase to two-phase conversion. The rotational coordinate converter 804 converts the stator currents $i_{s\alpha}$ and $i_{s\beta}$ in the two-phase coordinate system, into the stator currents $i_{s\alpha}$ and $i_{s\beta}$ in the rotational coordinate system by rotational coordinate conversion using the estimated rotor position $\hat{\theta}_r$.

Using the above-mentioned observer, the observer 805 computes the estimated rotor position $\hat{\theta}_r$ and an estimated rotational angular velocity $\hat{\omega}_r$. The estimated rotational angular velocity $\hat{\omega}_r$ is an estimated value of the rotational angular velocity. Note that Patent Literature 1 describes that the rotor position and the rotational angular velocity are estimated through a phase synchronizer as well as through the observer. The observer 805 herein is defined as having functionality of a phase synchronizer, too. In addition, the position estimator 8 is conveniently described as receiving values in the three-phase coordinate system, but the received values are not limited thereto. The position estimator 8 can receive values in the rotational coordinate system from the controller 5 or from the voltage integrator 7.

Moreover, assuming that the computation period of processing of computing the flux linkage $\psi_s$ using the observer is denoted by $T_{psi1}$, this computation period $T_{psi1}$ is not an integer multiple of half of the switching period $T_{sw}$. In addition, assuming that the computation period of processing of computing the estimated rotor position $\hat{\theta}_r$ after the processing of computation of the flux linkage $\psi_s$ is denoted by $T_{psi2}$, this computation period $T_{psi2}$ is also not an integer multiple of half of the switching period $T_{sw}$. Moreover, assuming that the integration time, which is the time period of processing of integrating the voltage integration value $v_{sxi}$, is denoted by $T_{gi}$, this integration time $T_{gi}$ is also not an integer multiple of half of the switching period $T_{sw}$.

Figure 7:
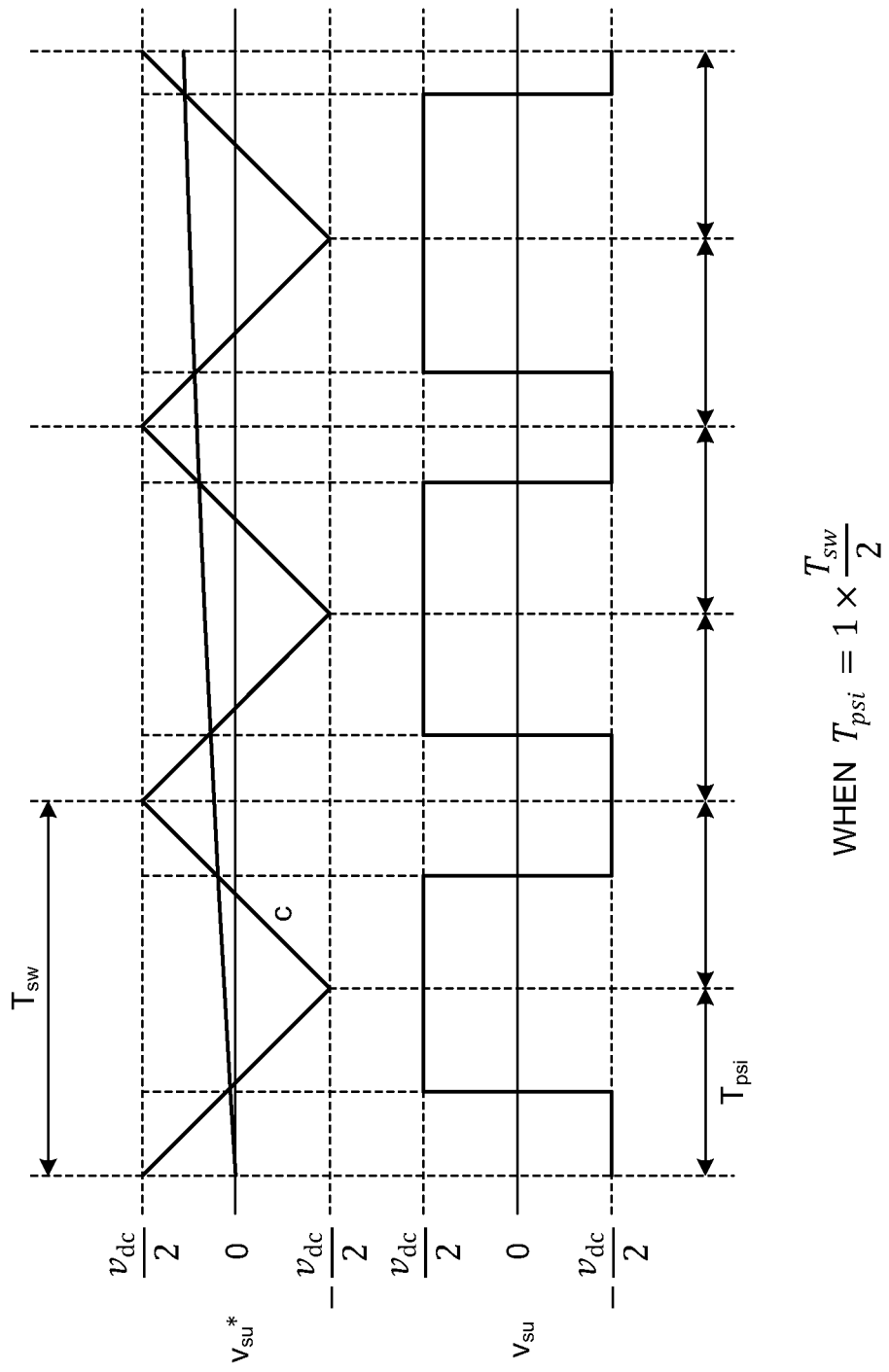
FIG. 7 is a first diagram for describing a relationship between a switching period and a control computation period in the first embodiment.
Figure 8:
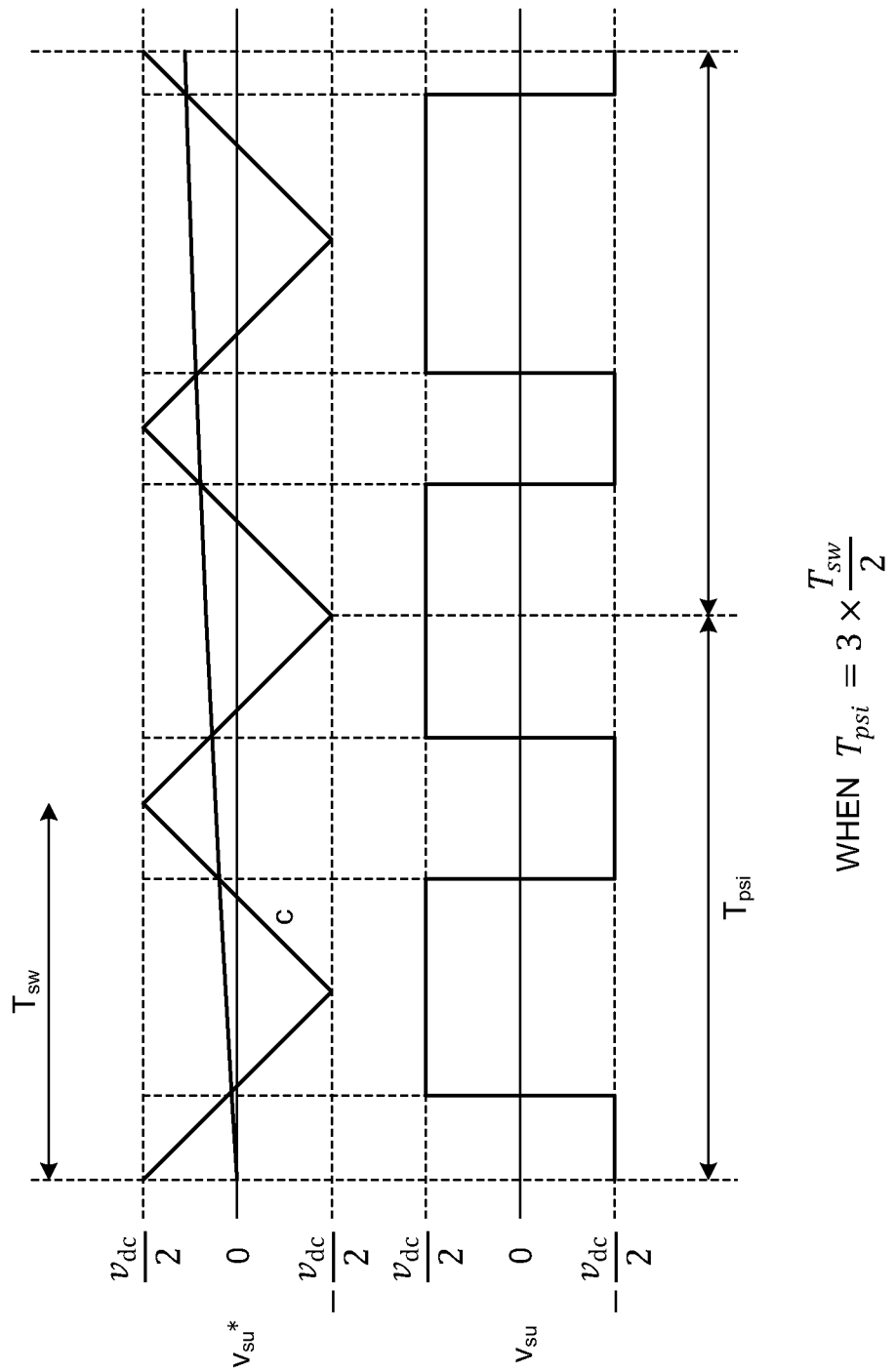
FIG. 8 is a second diagram for describing the relationship between the switching period and the control computation period in the first embodiment.

A relationship between the switching period $T_{sw}$ and a control computation period $T_{psi}$ will next be described with reference to the drawings of FIGS. 7 and 8. FIG. 7 is a first diagram for describing a relationship between the switching period $T_{sw}$ and the control computation period $T_{psi}$ in the first embodiment. FIG. 8 is a second diagram for describing the relationship between the switching period $T_{sw}$ and the control computation period $T_{psi}$ in the first embodiment. Note that the description it is herein made assuming that the computation period $T_{psi1}$ of the flux linkage $\psi_s$, the computation period $T_{psi2}$ of the estimated rotor position $\hat{\theta}_r$, and the integration time $T_{gi}$ of the voltage integration value $v_{sxi}$ are equal to one another, and that the control computation period $T_{psi}$ is also equal to each of the computation period $T_{psi1}$ of the flux linkage $\psi_s$, the computation period $T_{psi2}$ of the estimated rotor position $\hat{\theta}_r$, and the integration time $T_{gi}$ of the voltage integration value $v_{sxi}$.

Control operation of a rotary machine generally uses a command value instead of a detection value, as a value of the stator voltage. When the control computation period $T_{psi}$ is an integer multiple of half of the switching period $T_{sw}$, the voltage command value and the value obtained by smoothing the actual voltage will be equal to each other for each control computation period $T_{psi}$. Note that even when the average value of an actual voltage is used in the smoothing operation, the voltage command value will be almost equal to the average value.

The switching period $T_{sw}$ and the control computation period $T_{psi}$ are illustrated as having a relationship of $T_{psi}=1\times(T_{sw}/2)$ in FIG. 7, and as having a relationship of $T_{psi}=3\times(T_{sw}/2)$ in FIG. 8. The top portion of each figure illustrates a waveform of the phase-u voltage command value $v_{su}*$ and a waveform of the carrier signal c. The bottom portion of each figure illustrates a waveform of the phase-u voltage $v_{su}$. The phase-u voltage command value $v_{su}*$ has a sinusoidal waveform.

FIGS. 7 and 8 both show that the averaged phase-u voltage $v_{su}$ for the control computation period $T_{psi}$ is almost equal to the phase-u voltage command value $v_{su}*$. It is also shown that when the control computation period $T_{psi}$ is not an integer multiple of $T_{sw}/2$, the phase-u voltage $v_{su}$ smoothed for each control computation period $T_{psi}$ will not match the phase-u voltage command value $v_{su}*$. Meanwhile, the voltage integration value $v_{sxi}$ is computed at a computation frequency sufficiently higher than the switching frequency $f_{sw}$, in which case the voltage integration value extracted at any time is an accurate voltage integration value $v_{sxi}$ obtained in the integration time $T_{gi}$ immediately before the extraction. In addition, although computation processing of the voltage integration value $v_{sxi}$ is performed at a high computation frequency, the burden of computation will be small because this computation processing is a mere integration operation and allows for the extraction of the voltage integration value $v_{sxi}$ at any time.

As described above, the switching frequency $f_{sw}$ is set to an integer multiple of the fundamental wave frequency $f_s$. In this respect, the fundamental wave frequency $f_s$ of the rotary machine 2 is not constant, but varies continuously. For this reason, the carrier frequency, which is equivalent to the switching frequency $f_{sw}$, is required to vary in real time in accordance with the change in the fundamental wave frequency $f_s$. In order to make the control computation period $T_{psi}$ equal to an integer multiple of half of the switching period $T_{sw}$ under a typical control on a rotary machine, the control computation period $T_{psi}$ will need to vary sequentially in real time. To this end, the control computation period $T_{psi}$ should be changed during which the computation is conducted with the variable period, which will result in a high amount of control computation and a complex control design as well.

In view of this, in the first embodiment, the control computation period $T_{psi}$ is set to a fixed value, and is not sequentially adjusted to an integer multiple of half of the switching period $T_{sw}$. This reduces the amount of computation in control computation, eliminates the need for a computing device such as a costly microprocessor, and enables a relatively simple control design. This results in the voltage command value $v_s^*$ including an error relative to the actual voltage.

As described above, when the control computation period $T_{psi}$ is not adjusted to an integer multiple of half of the switching period $T_{sw}$, the stator voltages can include an error. When the stator voltages include an error, the flux linkage $\psi_s$ computed using these values will also include an error. In addition, the computation of the flux linkage $\psi_s$, which is basically integration processing, has a particularly large effect on near-DC components ranging from a direct current to a low-frequency component. In addition, an error in a near-DC component in each of the stator voltages will appear as an error near the fundamental wave frequency $f_s$ when converted into those in the rotational coordinate system rotating at the fundamental wave frequency $f_s$ in synchronization with the rotor position. An error near the fundamental wave frequency $f_s$ also occurs in the estimated rotor position $\hat{\theta}_r$ because the position estimation is performed using the flux linkage $\psi_s$ in the rotational coordinate system, more accurately, the d-axis-based active flux. Thus, use of the estimated rotor position $\hat{\theta}_r$ having a pulsating error in controlling the rotary machine 2 will cause the torque and the power to pulsate. In contrast, the position estimator 8 of the first embodiment uses the voltage integration values $v_{sxi}$ instead of the voltage command values $v_{su}^*$, $v_{sv}^*$, and $v_{sw}^*$ in computing the flux linkage $\psi_s$ and the estimated rotor position $\hat{\theta}_r$. As a result, it becomes possible to perform position estimation, removing the pulsation of torque and power that results from an error near the fundamental wave frequency $f_s$.

Figure 9:
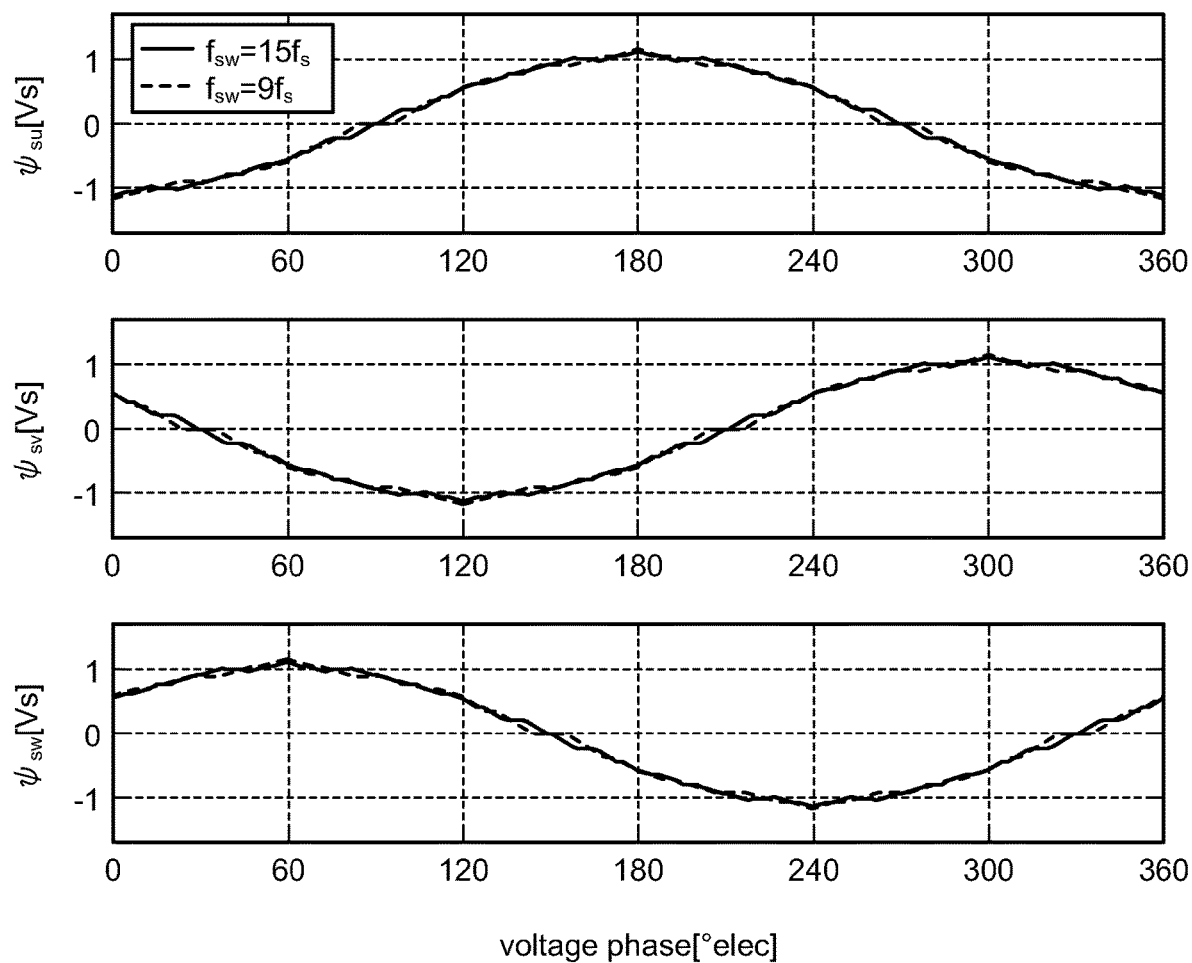
FIG. 9 is a first diagram for describing an effect produced when the PWM modulator illustrated in FIG. 1 switches a switching frequency.
Figure 10:
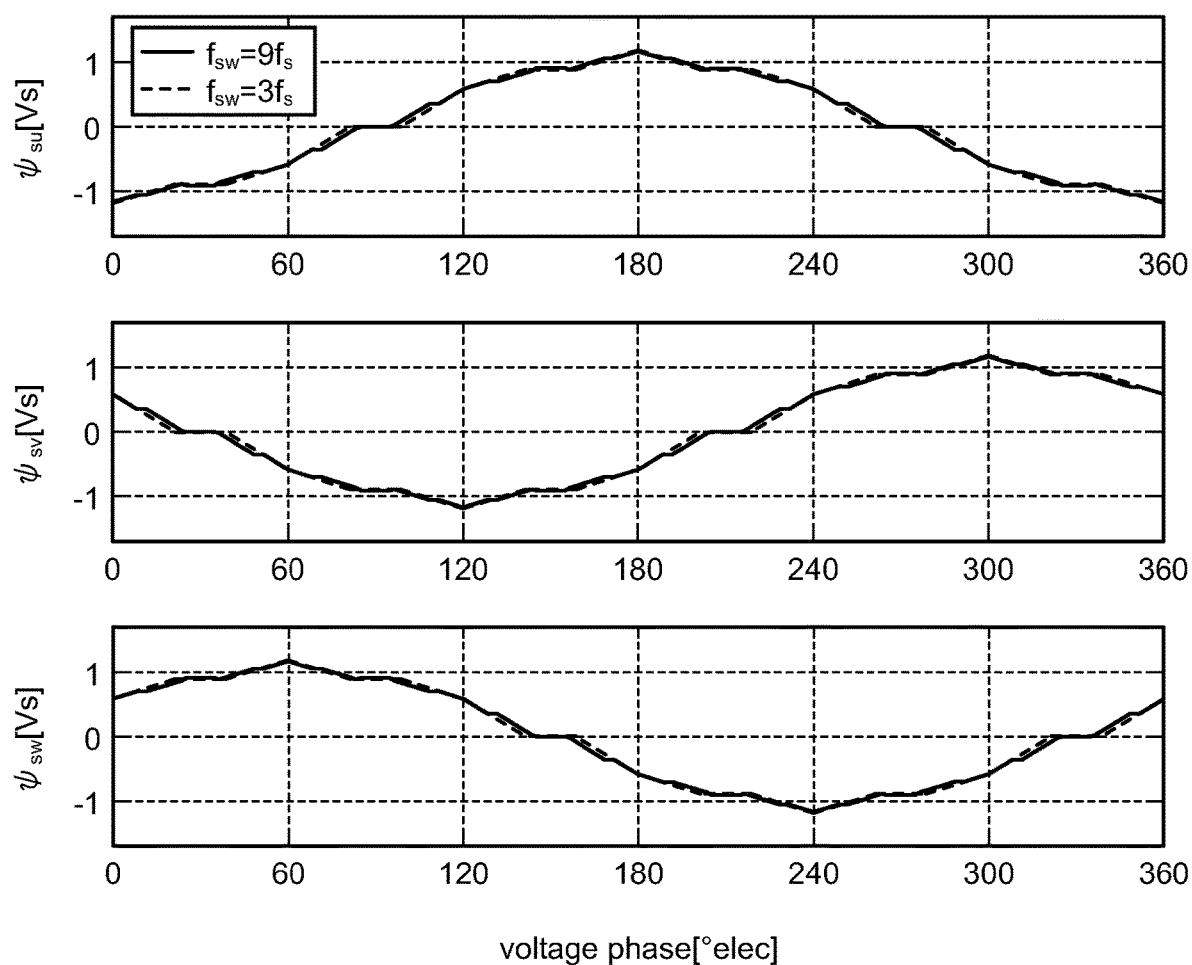
FIG. 10 is a second diagram for describing the effect produced when the PWM modulator illustrated in FIG. 1 switches the switching frequency.

An effect produced when the PWM modulator 6 switches the switching frequency $f_{sw}$ will next be described with reference to FIGS. 9 and 10. FIG. 9 is a first diagram for describing an effect produced when the PWM modulator 6 illustrated in FIG. 1 switches the switching frequency $f_{sw}$. FIG. 10 is a second diagram for describing the effect produced when the PWM modulator 6 illustrated in FIG. 1 switches the switching frequency $f_{sw}$.

FIG. 9 illustrates waveforms of the flux linkage $\psi_s$ when the fundamental wave components of the stator voltage $v_s$ have the same amplitudes under the conditions that: the switching frequency $f_{sw}$ is $15f_s$; and the switching frequency $f_{sw}$ is $9f_s$ such that the waveforms of the flux linkage $\psi_s$ are compared phase-by-phase. As illustrated in FIG. 9, it is seen that even when the fundamental wave components are the same, the instantaneous values of the two waveforms differ from each other. When the switching frequency $f_{sw}$ is switched with the instantaneous values differing from each other, the difference present at the time of the switching of the switching frequency $f_{sw}$ still remains as an error in the DC component after the switching of the switching frequency $f_{sw}$ because the flux linkage is is basically an integration value of the stator voltage vs. Similarly, FIG. 10 illustrates waveforms of the flux linkage $\psi_s$ when the fundamental wave components of the stator voltage vs have the same amplitudes under the conditions that: the switching frequency $f_{sw}$ is $9f_s$; and the switching frequency $f_{sw}$ is $3f_s$. It is also seen from FIG. 10 that even when the fundamental wave components are the same, the instantaneous values of the two waveforms differ from each other. Accordingly, when the switching frequency is switched, the difference present at the time of the switching of the switching frequency still remains as an error in the DC component after the switching of the switching frequency.

The conventional technology described in Patent Literature 1 uses a command value as the stator voltage in computing the magnetic flux, and estimating the rotor position. The stator voltage command value is determined in consideration of only the fundamental wave component without consideration of the instantaneous value. As a result, an error in a near-DC component as described above occurs when the switching frequency is switched. An error in the DC component in the three-phase coordinate system appears as an error in a near-fundamental-wave-frequency component in the rotational coordinate system. The rotor position estimated using this causes an error near the fundamental wave frequency. This will result in a torque pulsation and a power pulsation in the rotary machine 2. In contrast, instead of using the voltage command value $v_s^*$, the position estimator 8 of the first embodiment uses the voltage integration value $v_{sxi}$, i.e., an integral of the instantaneous value, in the processing of computation of position estimation. It thus becomes possible to estimate the position, removing the pulsation of torque and of power resulting from an error near the fundamental wave frequency $f_s$.

Advantages of the foregoing control computation according to the first embodiment will next be summarized. First, in the first embodiment, the switching frequency is synchronized with an integer multiple of the fundamental wave frequency $f_s$ of the rotary machine 2. This enables supplying the rotary machine 2 with a stator voltage having low distortion and a stator current having low distortion even at a low switching frequency. In addition, in the first embodiment, neither the computation period $T_{psi1}$ of the flux linkage $\psi_s$ or the computation period $T_{psi2}$ of the estimated rotor position $\hat{\theta}_r$ used in the observer 805 is sequentially adjusted to an integer multiple of half of the switching period $T_{sw}$. This reduces the amount of computation in control computation, eliminates the need for a computing device such as a costly microprocessor, and enables a relatively simple control design. With such configuration, it becomes possible to use the voltage integration value $v_{sxi}$ to thereby estimate the rotor position, reducing an error near the fundamental wave frequency $f_s$ and pulsation. This results in an unprecedented outstanding advantage that the control device 100 including no position sensor and providing a low level of torque pulsation and a low level of power pulsation can be made without need for a costly microprocessor.

As described above, according to the rotary machine control device according to the first embodiment, the voltage integrator integrates a gate signal to thereby compute a voltage integration value, and the position estimator estimates the rotor position on the basis of the voltage integration value and the stator currents. This can reduce torque pulsation and power pulsation resulting from an estimation error that can be included in an estimated value of the rotor position.

Note that the rotary machine control device according to the first embodiment can include a voltage detector for detecting the stator voltage output by the voltage applicator. In this case, the voltage integration value can be obtained by integration of the detection value of the stator voltage detected by the voltage detector, instead of integration of the gate signal. Such operation also provides an advantage of reduction in torque pulsation and power pulsation.

To obtain an estimated value of the rotor position, a component rotating in synchronization with the rotor position is estimated from components of the flux linkage, and the estimated value of the rotor position is computed from the phase of that estimated value. The flux linkage for use in computing the estimated value of the rotor position can be computed using the voltage integration values. Integration operation for the flux linkage may produce an offset component and cause an error and a pulsation in the estimated value, but use of the technique of the first embodiment makes it possible to reduce the error and the pulsation that can be included in the estimated value.

Moreover, according to the rotary machine control device according to the first embodiment, the PWM modulator synchronizes the switching frequency of switching on and off the switching elements with an integer multiple of the fundamental wave frequency of the rotational speed of the rotary machine. This enables supplying the rotary machine with a stator voltage having low distortion and a stator current having low distortion. Furthermore, synchronous PWM provides a large voltage error between the voltage command value, i.e., the command value of the stator voltage, and the actual voltage, but use of this technique enables the accurate computation of the stator voltage. This makes it possible to reduce the error and the pulsation that can be included in the estimated value of the rotor position.

Note that the rotary machine control device according to the first embodiment can offer the advantages thereof when the computation period for which the rotor position is estimated is not an integer multiple of half of the switching period. When the computation period for estimating the rotor position is not adjusted to an integer multiple of half of the switching period, the estimated value of the rotor position may include an error, but use of the technique of the first embodiment makes it possible to reduce such error.

In addition, the rotary machine control device according to the first embodiment can offer the advantages thereof when the computation period for which the flux linkage is computed is not an integer multiple of half of the switching period. When the computation period for computing the flux linkage is not adjusted to an integer multiple of half of the switching period, the stator voltage and the stator current may include an error, but the technique of the first embodiment makes it possible to reduce such error.

Note that in the rotary machine control device according to the first embodiment, the computation frequency, which is the frequency at which the voltage integration value is computed, is preferably 25 or more times the switching frequency. Such setting of the frequency enables the accurate computation of the voltage integration value.

In addition, in the rotary machine control device according to the first embodiment, it is desirable that the switching frequency for the voltage applicator to switch on and off the switching elements be switched depending on the fundamental wave frequency of the rotational speed of the rotary machine. A large voltage error will occur between the voltage command value and the stator voltage upon switching of the switching frequency, but use of this technique makes it possible to reduce such error.

Second Embodiment

Figure 11:
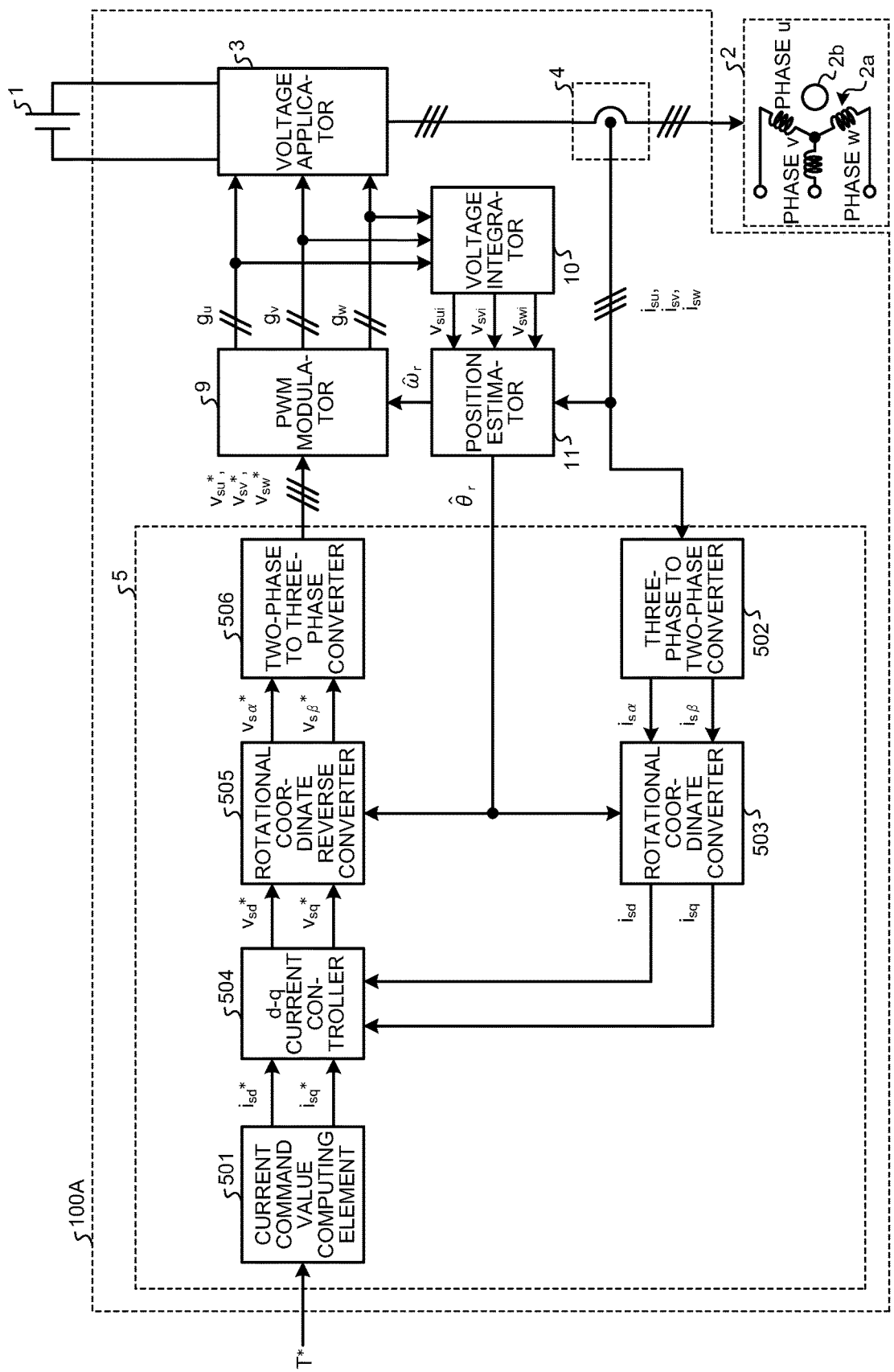
FIG. 11 is a diagram illustrating an example configuration of a rotary machine control device according to a second embodiment.

FIG. 11 is a diagram illustrating an example configuration of a rotary machine control device 100A according to a second embodiment. Comparison of the control device 100A according to the second embodiment with the control device 100 illustrated in FIG. 1 reveals that FIG. 11 replaces the PWM modulator 6 with a PWM modulator 9, the voltage integrator 7 with a voltage integrator 10, and the position estimator 8 with a position estimator 11. The other part of the configuration is the same as or equivalent to the corresponding part of the configuration of the control device 100. The same or equivalent components are designated by like reference characters, and duplicate description will be omitted.

The PWM modulator 9 generates the gate signals $g_u$, $g_v$, and $g_w$ similarly to the PWM modulator 6 of the first embodiment, but varies the switching frequency $f_{sw}$ in a manner different than the PWM modulator 6 does. Specifically, the PWM modulator 9 varies the switching frequency $f_{sw}$ depending on the amplitude of the stator voltage vs rather than depending on the fundamental wave frequency $f_s$. Since the magnitude of the flux linkage $\psi_s$ for producing torque of the rotary machine 2 does not vary with the rotational speed, the stator voltage vs of the rotary machine 2 can be considered as being proportional to the fundamental wave frequency $f_s$.

Figure 12:
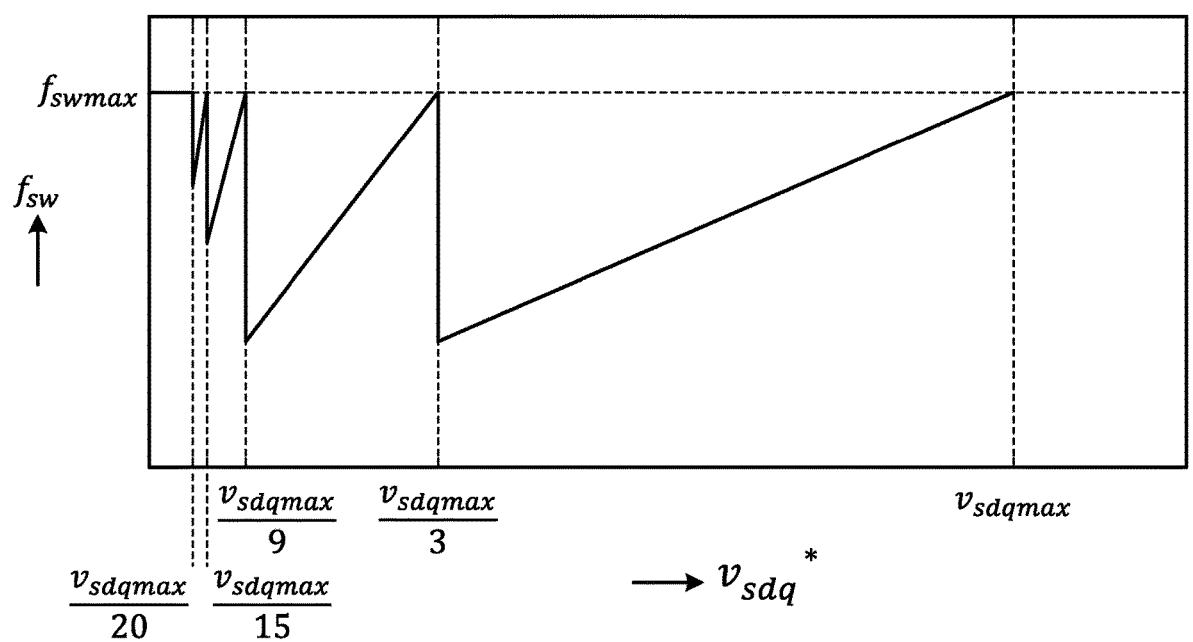
FIG. 12 is a diagram for describing operation of the PWM modulator illustrated in FIG. 11.

FIG. 12 is a diagram for describing operation of the PWM modulator 9 illustrated in FIG. 11. FIG. 12 illustrates a relationship between an amplitude $v_{sdq}^*$ of the voltage command value $v_s^*$ and the switching frequency $f_{sw}$. In the second embodiment, as illustrated in FIG. 12, the switching frequency $f_{sw}$ is varied depending on the amplitude $v_{sdq}^*$. As in FIG. 4, the value $v_{sdqmax}$ is the maximum amplitude of the amplitude $v_{sdq}^*$, and the frequency $f_{swmax}$ is the maximum switching wave frequency. The example of FIG. 12 is where: the switching frequency $f_{sw}$ is 15 times the fundamental wave frequency $f_s$ when the amplitude $v_{sdq}^*$ exceeds $v_{sdqmax}/20$ but is not more than $v_{sdqmax}/15$, inclusive; and nine times the fundamental wave frequency $f_s$ when the amplitude $v_{sdq}^*$ exceeds $v_{sdqmax}/15$ but is not more than $v_{sdqmax}/9$. In addition, the switching frequency $f_{sw}$ is three times the fundamental wave frequency $f_s$ when the amplitude $v_{sdq}^*$ exceeds $v_{sdqmax}/9$ but is not more than $v_{sdqmax}/3$; and the switching frequency $f_{sw}$ is equal to the fundamental wave frequency $f_s$ when the amplitude $v_{sdq}^*$ is higher than $v_{sdqmax}/3$. Note that the frequency $f_{swmax}$ is simply used when the amplitude $v_{sdq}^*$ is less than or equal to $v_{sdqmax}/20$. In addition, assuming that a carrier signal common to the three phases is used, the switching frequency $f_{sw}$ is set to be one, three, nine, or 15 times the fundamental wave frequency. Note that the amplitude $v_{sdq}^*$ can be calculated using Equation (17) below.

Formula 17

$$v_{sdq}^* = \sqrt{v_{sd}^{*2} + v_{sq}^{*2}} \qquad (17)$$

Figure 13:
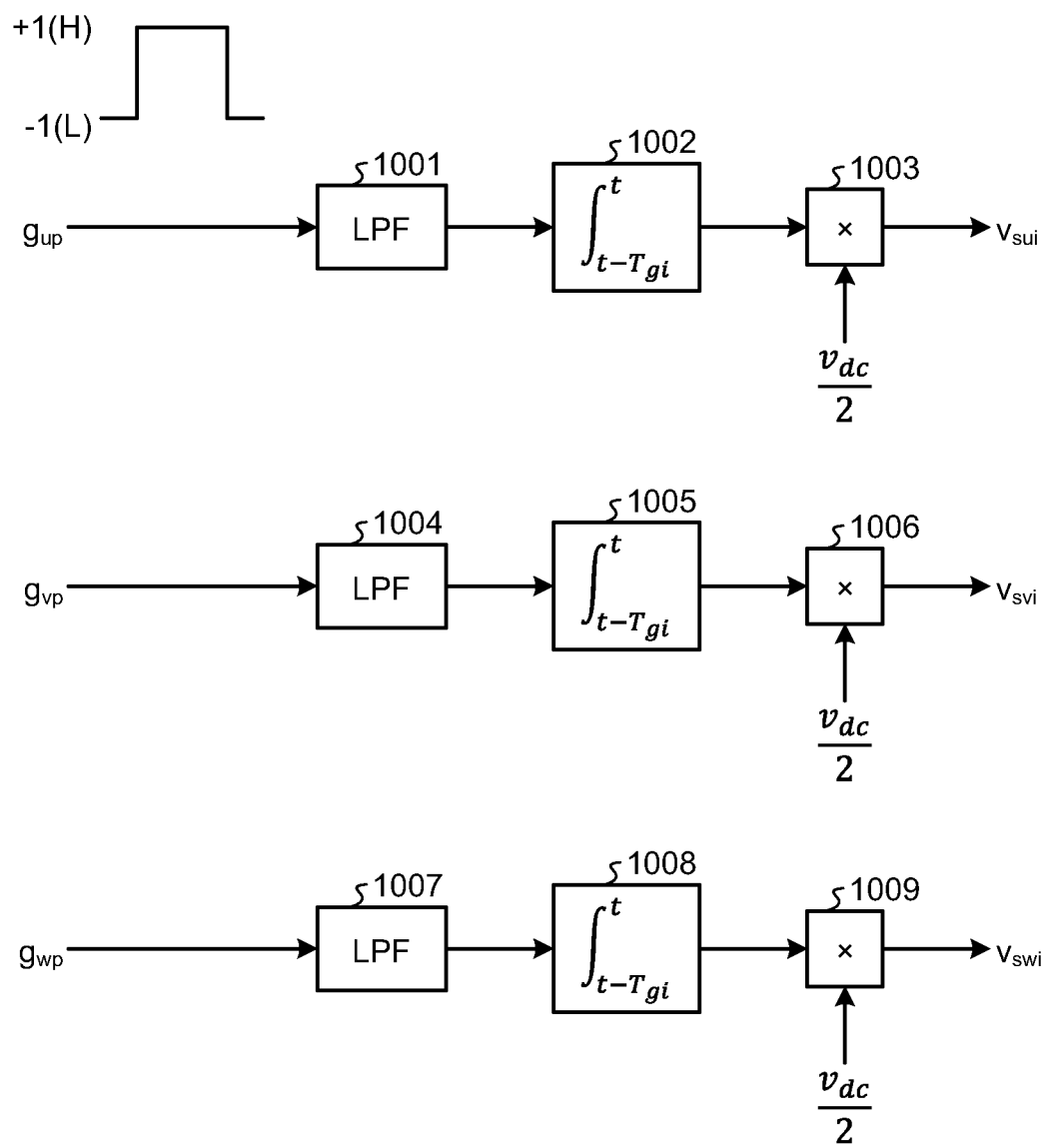
FIG. 13 is a diagram illustrating an example configuration of the voltage integrator illustrated in FIG. 11.

FIG. 13 is a diagram illustrating an example configuration of the voltage integrator 10 illustrated in FIG. 11. FIG. 13 illustrates a configuration including LPFs 1001, 1004, and 1007, integrators 1002, 1005, and 1008, and multipliers 1003, 1006, and 1009. As one of a positive-side gate signal and a negative-side gate signal is an inverted signal of the other, FIG. 13 illustrates only components relating to the positive-side gate signals.

An operation for phase u will first be described. The positive-side gate signal $g_{up}$ passes through the LPF 1001, and is subsequently input to the integrator 1002. The LPF 1001 cuts off high-frequency components of the gate signal $g_{up}$ to smooth the waveform of the gate signal $g_{up}$. The integrator 1002 integrates the gate signal $g_{up}$, taking a high level H as "+1" and a low level L as "−1". The integration time $T_{gi}$, which is the time period for performing integration, is a time period from a time earlier than the current time "t" by $T_{gi}$ to the current time "t". After integration of the gate signal $g_{up}$, the multiplier 1003 multiplies the integrated value from the integrator 1002 by $v_{dc}/2$, i.e., a half of the supply voltage $v_{dc}$, and outputs the product as the phase-u voltage integration value $v_{sui}$. This enables computing an integrated value of the instantaneous value of the phase-u voltage $v_{su}$ of a rectangular waveform. The integrators 1005 and 1008 and the multipliers 1006 and 1009 perform similar operations for the other phases, i.e., for phase v and phase w. As a result, the phase-v voltage integration value $v_{svi}$ is output from the multiplier 1006, and the phase-w voltage integration value $v_{swi}$ is output from the multiplier 1009.

As the voltage integration value is a computed integral of the instantaneous value of the stator voltage $v_s$ of a rectangular waveform, the voltage integration value $v_{sxi}$ is computed at a computation frequency set to a value sufficiently higher than the switching frequency $f_{sw}$ of the gate signal generated by the PWM modulator 9. In order that the computation frequency is sufficiently high, the computation frequency is preferably 25 or more times the switching frequency $f_{sw}$, and more preferably 100 or more times the switching frequency $f_{sw}$. In addition, a burden of this integration operation itself is small. Even with a high computation frequency, thus, a computing device bears a small computation burden as compared to the amount of calculation necessary to control the rotary machine 2. The value of the supply voltage $v_{dc}$ for use in this operation can be a detection value, a rated value, or an expected value during use.

The LPFs 1001, 1004, and 1007 can each be a first-order LPF whose transfer function is expressed by, for example, Equation (18) below.

Formula 18

$$H(s) = \frac{\omega_c}{s + \omega_c} \quad (18)$$

In Equation (18) above, $\omega_c$ is a cut-off angular frequency. The LPFs 1001, 1004, and 1007 can each be implemented by a digital filter or an analog filter. Alternatively, the LPFs 1001, 1004, and 1007 can each be a second-order filter or one that uses a moving average.

Advantages in use of the LPFs 1001, 1004, and 1007 will next be described with reference to FIGS. 14 and 15. The LPFs 1001, 1004, and 1007 are each hereinafter collectively referred to as simply "LPF".

Figure 14:
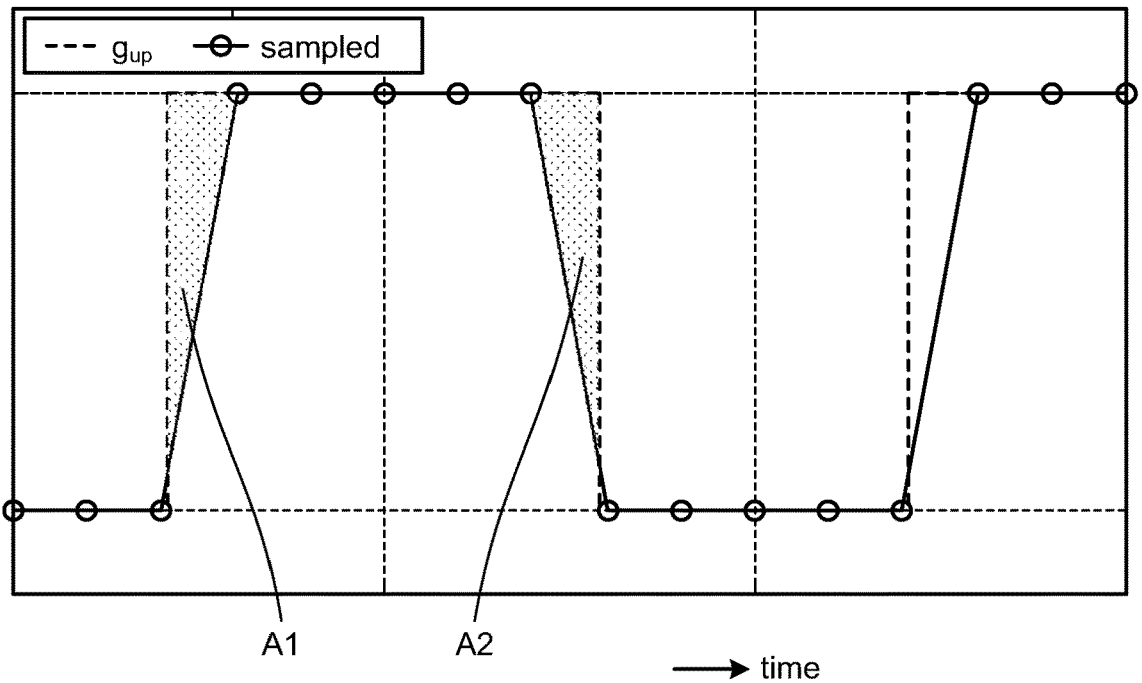
FIG. 14 is a diagram for describing operation when the voltage integrator in the second embodiment includes no low-pass filter (LPF).
Figure 15:
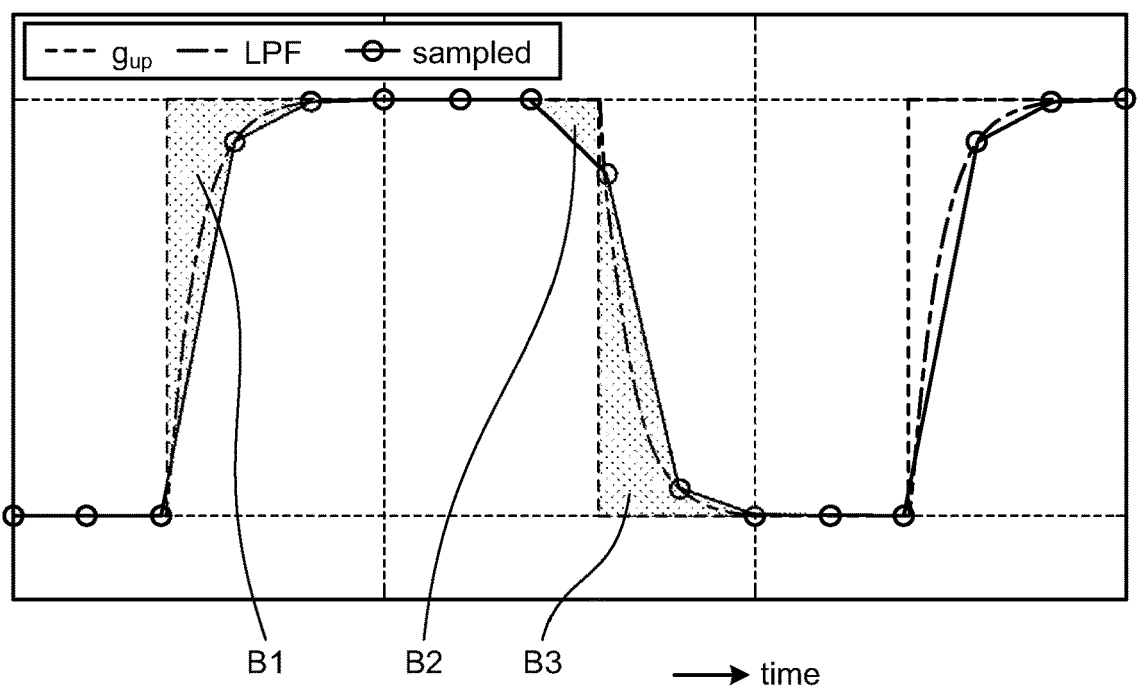
FIG. 15 is a diagram for describing operation when the voltage integrator in the second embodiment includes an LPF.

FIG. 14 is a diagram for describing operation when the voltage integrator 10 in the second embodiment includes no LPF. In FIG. 14, the broken line represents a waveform of the gate signal $g_{up}$, a circle symbol represents a sampling point, and the solid line represents a post-sampling waveform of the gate signal $g_{up}$. In addition, FIG. 15 is a diagram for describing operation when the voltage integrator 10 in the second embodiment includes an LPF. In FIG. 15, the broken line represents a waveform of the gate signal $g_{up}$, the dash dot line represents a waveform of the gate signal $g_{up}$ having passed through the LPF, a circle symbol represents a sampling point, and the solid line represents a post-sampling waveform of the gate signal $g_{up}$ having passed through the LPF.

In the case of FIG. 14, hatched portions A1 and A2, which are the portions having their areas enclosed by the broken line and the solid line, represent the integration error. Also in the case of FIG. 15, the portions having their areas enclosed by the broken line and the solid line together represent the integration error. Referring to the waveforms of FIG. 15, the post-sampling waveform slightly deviates from the waveform of the gate signal $g_{up}$ having passed through the LPF. Referring to the waveforms of FIG. 14, the post-sampling waveform greatly deviates from the waveform of the gate signal $g_{up}$. In addition, as the areas of the portions A1 and A2 in FIG. 14 have the same signs, the sum of the areas of the portions A1 and A2 represents the integration error for one period of the gate signal $g_{up}$. In contrast, in the case of FIG. 15, the area of hatched portions B1 and B2 and the area of a hatched portion B3 have different signs from each other, and thus the difference between B3 and the sum of B1 and B2 represents the integration error for one period of the gate signal $g_{up}$. This demonstrates that use of an LPF makes it possible to accurately compute the voltage integration value $v_{sxi}$. The use of an LPF makes it possible to more precisely compute the voltage integration value $v_{sxi}$ even at a low sampling frequency, i.e., a low computation frequency at which the voltage integration value $v_{sxi}$ is computed.

Figure 16:
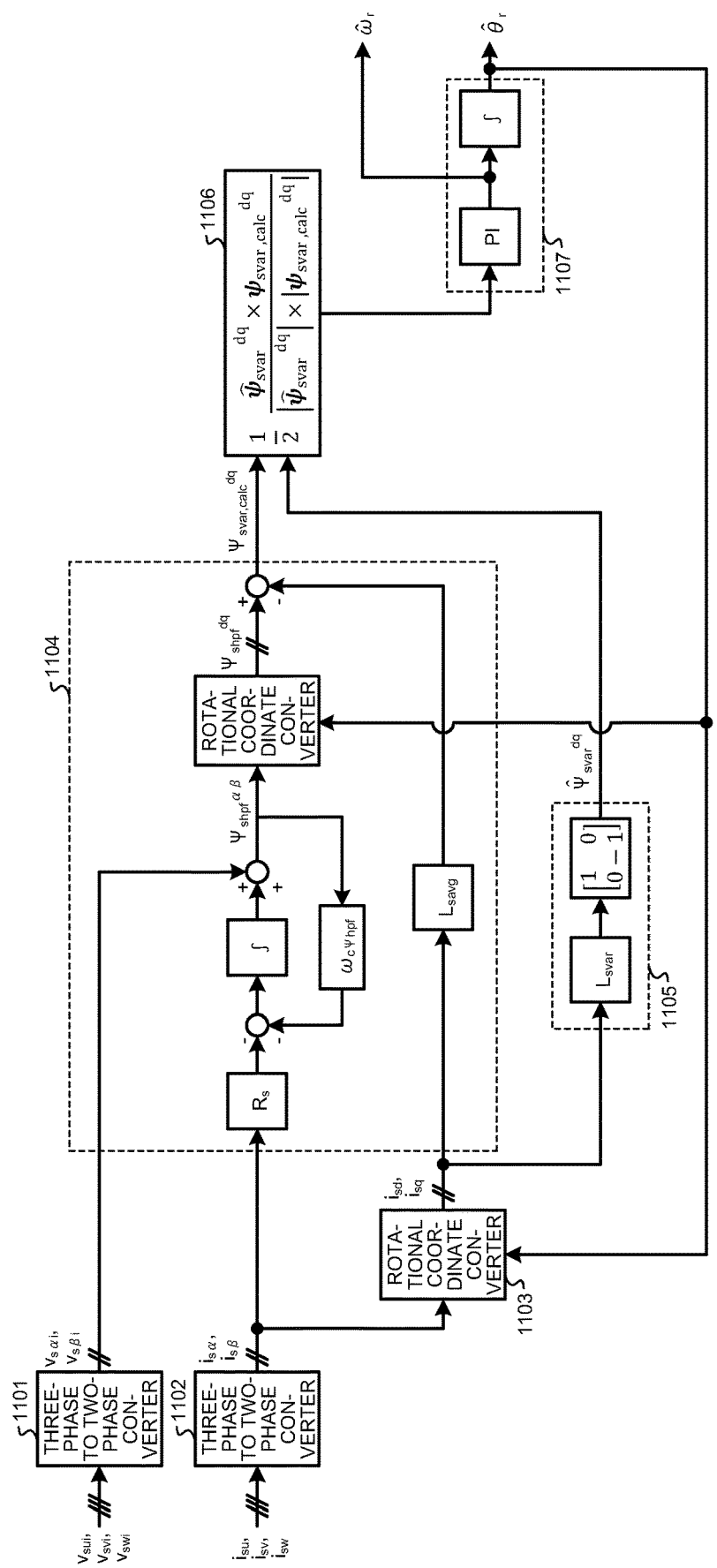
FIG. 16 is a diagram illustrating an example configuration of the position estimator illustrated in FIG. 11.

FIG. 16 is a diagram illustrating an example configuration of the position estimator 11 illustrated in FIG. 11. The position estimator 11 can be configured to include three-phase to two-phase converters 1101 and 1102, a rotational coordinate converter 1103, a first computing element 1104, a first estimator 1105, a second computing element 1106, and a third computing element 1107.

The three-phase to two-phase converter 1101 converts, by three-phase to two-phase conversion, the voltage integration values $v_{sui}$, $v_{svi}$, and $v_{swi}$ in the three-phase coordinate system computed by the voltage integrator 10, into the voltage integration values $v_{s\alpha i}$ and $v_{s\beta i}$ in the two-phase coordinate system. Similarly, the three-phase to two-phase converter 1102 converts the stator currents $i_{su}$, $i_{sv}$, and $i_{sw}$ in the three-phase coordinate system into the stator currents $i_{s\alpha}$ and $i_{s\beta}$ in the two-phase coordinate systems, by three-phase to two-phase conversion. The rotational coordinate converter 1103 converts the stator currents $i_{s\alpha}$ and $i_{s\beta}$ in the two-phase coordinate system into the stator currents $i_{sd}$ and $i_{sq}$ in the rotational coordinate system, by rotational coordinate conversion using the estimated rotor position $\hat{\theta}_r$.

Operational details of the first computing element 1104 and of the first estimator 1105 will next be described. The first computing element 1104 computes a flux linkage inductance variable component, and the first estimator 1105 estimates the flux linkage inductance variable component.

First, the flux linkage $\psi_s^{\alpha\beta}$ of the rotary machine 2 in the two-phase coordinate system is obtained by Equation (19) below.

Formula 19

$$\psi_s^{\alpha\beta} = \int (v_s^{\alpha\beta} - R_s i_s^{\alpha\beta}) dt \qquad (19)$$

In addition, the integration operation of Equation (19) above is expressed by the transfer function expressed by Equation (20) below.

Formula 20

$$\psi_s^{\alpha\beta} = \frac{v_s^{\alpha\beta} - R_s i_{ss}^{\alpha\beta}}{s} \qquad (20)$$

In general, when the flux linkage is computed by integration, the initial value is usually unknown. Thus, when the flux linkage is to be computed in a three-phase coordinate system and in a two-phase coordinate system, both of which are static coordinate systems, a high-pass filter (HPF) having a cut-off frequency sufficiently lower than the fundamental wave frequency component is utilized. This technique, that is, the technique of computing the flux linkage in a static coordinate system, using integration and an HPF, is herein referred to as "incomplete integration". The transfer function of the high-pass filter to be used in this incomplete integration can be expressed by Equation (21) below, where $\omega_{hpf}$ represents the cut-off frequency.

Formula 21

$$G_{hpf}(s) = \frac{s}{s + \omega_{hpf}} \qquad (21)$$

Applying the HPF expressed by Equation (21) above to Equation (20) above results in Equation (22) below.

Formula 22

$$\psi_{shpf}^{\alpha\beta} = \frac{v_s^{\alpha\beta} - R_s i_s^{\alpha\beta}}{s + \omega_{hpf}} \qquad (22)$$

Equation (22) above is an expression that expresses a flux linkage $\psi_{shpf}^{\alpha\beta}$ when an HPF is employed. In addition, Equation (22) above is modified to result in Equation (23) below.

Formula 23

$$\psi_{shpf}^{\alpha\beta} = \frac{v_s^{\alpha\beta} - R_s i_s^{\alpha\beta} - \omega_{hpf} \psi_{shpf}^{\alpha\beta}}{s} \qquad (23)$$

Note that the first term on the right-hand side of Equation (23) above is the integral value of the stator voltage $v_s^{\alpha\beta}$. In view of this, the second embodiment uses, for this part, the voltage integration value $v_{sxi}$ computed by the voltage integrator 10. Note that the conventional technology described in Patent Literature 1 uses a voltage command value $v_s^{\alpha\beta*}$ as the stator voltage $v_s^{\alpha\beta}$.

Position sensorless control of a synchronous reluctance motor allows the use of the technique utilizing the incomplete integration in computing the flux linkage. The technique utilizing the incomplete integration provides a smaller burden of computation than when an observer. This allows the use of a computing device such as a less costly microprocessor.

In addition, in the second embodiment, the computation period $T_{psi1}$ for which the flux linkage is computed using the incomplete integration is not an integer multiple of half of the switching period $T_{sw}$, and the computation period $T_{psi2}$ for which the estimated rotor position $\hat{\theta}_r$ is subsequently computed is not an integer multiple of half of the switching period $T_{sw}$, either.

The flux linkage $\psi_s^{\alpha\beta}$ of the rotary machine 2 is expressed by Equation (6) above in the two-phase coordinate system. Rotational coordinate conversion of this flux linkage $\psi_s^{\alpha\beta}$, using the estimated rotor position $\hat{\theta}_r$ results in Equation (24) below.

Formula 24

$$\psi_s^{dq} = L_{savg} i_s^{dq} + L_{svar} \begin{bmatrix} \cos(2(\theta_r - \hat{\theta}_r)) & \sin(2(\theta_r - \hat{\theta}_r)) \\ \sin(2(\theta_r - \hat{\theta}_r)) & -\cos(2(\theta_r - \hat{\theta}_r)) \end{bmatrix} i_s^{dq} \qquad (24)$$

In Equation (24) above, the first term is a term including the inductance averaged component $L_{savg}$. The inductance averaged component $L_{savg}$ is invariable regardless of the rotor position. The second term is a term including the inductance variable component $L_{svar}$. The inductance variable component $L_{svar}$ varies at a frequency twice the electrical angle frequency of the rotor position.

The first computing element 1104 obtains a component corresponding to the second term of Equation (24) above by calculation. Specifically, that component is computed using Equation (25) below that is the modification to Equation (24) above.

Formula 25

$$\psi_{svar,calc}^{dq} = \psi_{shpf}^{dq} - L_{savg} i_s^{dq} \qquad (25)$$

The first term on the right-hand side of Equation (25) above is obtained by rotational coordinate conversion of the flux linkage $\psi_{shpf}^{\alpha\beta}$ shown by Equation (23) above. In addition, the second term on the right-hand side of Equation (25) above represents the first term of Equation (24) above. FIG. 16 illustrates an example configuration of the first computing element 1104, but the configuration is not limited to this example.

Meanwhile, the first estimator 1105 directly estimates a component corresponding to the second term of Equation (24) above. FIG. 16 illustrates an example configuration of the first estimator 1105. The following description is made as to a reason why the first estimator 1105 can be simple, as shown in FIG. 16.

First, assuming that the second term of Equation (24) above is an estimated value of the flux linkage inductance variable component in the rotational coordinate system, $\hat{\psi}_{svar}^{dq}$ representing this estimated value can be expressed as Equation (26) below.

Formula 26

$$\hat{\psi}_{svar}^{dq} = L_{svar} \begin{bmatrix} \cos(2(\theta_r - \hat{\theta}_r)) & \sin(2(\theta_r - \hat{\theta}_r)) \\ \sin(2(\theta_r - \hat{\theta}_r)) & -\cos(2(\theta_r - \hat{\theta}_r)) \end{bmatrix} i_s^{dq} \qquad (26)$$

Approximating the estimated rotor position $\hat{\theta}_r$ to a value nearly equal to the true value $\theta_r$ of the rotor position in Equation (26) above, Equation (26) above can be simplified as Equation (27) below. Note that FIG. 6 illustrates a configuration of the controller representing this Equation (27).

Formula 27

$$\hat{\psi}_{svar}^{dq} = L_{svar}\begin{bmatrix} 1 & 0 \\ 0 & -1 \end{bmatrix} i_s^{dq} \tag{27}$$

Operational details of the second computing element 1106 and of the third computing element 1107 will next be described.

First, the cross product of the estimated value $\hat{\psi}_{svar}^{dq}$ of the flux linkage inductance variable component and the computed value $\psi_{svar,calc}^{dq}$ is expressed by Equation (28) below.

Formula 28

$$\hat{\psi}_{svar}^{dq} \times \psi_{svar,calc}^{dq} = |\hat{\psi}_{svar}^{dq}||\psi_{svar,calc}^{dq}|\sin(2(\theta_r - \hat{\theta}_r)) \tag{28}$$

Approximating the estimated rotor position $\hat{\theta}_r$ to a value nearly equal to the true value $\theta_r$ of the rotor position, that is, approximating the estimated rotor position $\hat{\theta}_r$ to provide $\hat{\theta}_r \approx \theta_r$, in Equation (28) above, the estimation error "$-(\hat{\theta}_r - \theta_r)$" of the rotor position can be computed using Equation (29) below.

Formula 29

$$-(\theta_r - \hat{\theta}_r) = \frac{1}{2} \frac{\hat{\psi}_{svar}^{dq} \times \psi_{svar,calc}^{dq}}{|\hat{\psi}_{svar}^{dq}||\psi_{svar,calc}^{dq}|} \tag{29}$$

As described above, the second computing element 1106 computes the estimation error "$-(\hat{\theta}_r - \theta_r)$" of the rotor position on the basis of the computed value obtained by Equation (25) above and the estimated value obtained by Equation (27) above.

The estimation error "$-(\hat{\theta}_r - \theta_r)$" of the rotor position computed by the second computing element 1106 is input to the third computing element 1107. The third computing element 1107 performs proportional-integral (PI) control on the estimation error "$-(\hat{\theta}_r - \theta_r)$" of the rotor position, and then integrates the result of the PI control to cause the estimation error "$-(\hat{\theta}_r - \theta_r)$" of the rotor position to converge to zero. The third computing element 1107 thus computes the estimated rotor position $\hat{\theta}_r$. The third computing element 1107 also computes the estimated rotational angular velocity $\hat{\omega}_r$ in the process of causing the estimation error "$-(\hat{\theta}_r - \theta_r)$" of the rotor position to converge to zero.

As described above, the rotary machine control device according to the second embodiment is designed such that the technique for estimating the rotor position using a voltage integration value, i.e., an integrated value of the stator voltage, is applicable to the configuration for computing the flux linkage in a static coordinate system. For position sensorless control of the rotary machine that is a synchronous reluctance motor, the flux linkage is computed by integration performed in a static coordinate system. This makes it more likely to generate an offset component, and produce an error and pulsation in the estimated value. Accordingly, the technique of the second embodiment can be suitably used when a synchronous reluctance motor is controlled without a position sensor.

In addition, in the rotary machine control device according to the second embodiment, it is desirable that the voltage integration value be computed after the gate signal or the detection value of the stator voltage passes through a low-range filter. Such operation makes it possible to more precisely compute the voltage integration value as well as to reduce the computation burden of computing the voltage integration value.

In addition, in the rotary machine control device according to the second embodiment, it is desirable that the switching frequency for the voltage applicator to switch on and off the switching elements be switched depending on the amplitude of the voltage command value. A large voltage error will occur between the voltage command value and the stator voltage upon switching of the switching frequency, but use of this technique can reduce such error.

Advantages of the foregoing control computation according to the second embodiment will next be summarized. First, in the second embodiment, neither the computation period $T_{psi1}$ of the flux linkage $\psi_s$ computed using Equation (23) above using the incomplete integration, nor the computation period $T_{psi}$ of the estimated rotor position $\hat{\theta}_r$ is an integer multiple of half of the switching period $T_{sw}$. In this case, the voltage command value $v_s^*$ does not match the value obtained by smoothing the actual voltage. As a result, the voltage command value $v_s^*$ includes an error relative to the actual voltage. An error therefore also occurs in the flux linkage $\psi_s$ computed using a conventional technology. Moreover, in the second embodiment, the flux linkage $\psi_s$ is computed using the incomplete integration rather than using an observer for making the flux linkage $\psi_s$ converge to the true value. This will result in a large error in the flux linkage $\psi_s$, and also relatively slow convergence to the true value. In addition, since the flux linkage is computed basically on the basis of integration processing, such error will be large in components ranging from DC to a low-frequency component. This will generate a large error near the fundamental wave frequency $f_s$ in the rotational coordinate system, and will also generate a large error in the estimated rotor position $\hat{\theta}_r$ near the fundamental wave frequency $f_s$. To address this problem, the position estimator 11 of the second embodiment uses the voltage integration value $v_{sxi}$ rather than the voltage command value $v_s^*$ in computing the flux linkage $\psi_s$ and the estimated rotor position $\hat{\theta}_r$. This makes it possible to estimate the rotor position, reducing the error and pulsation at frequencies near the fundamental wave frequency. In addition, the position estimator 11 of the second embodiment computes the flux linkage, using incomplete integration without using an observer. This makes it possible to further reduce the computation burden as compared to the first embodiment. Thus, use of the technique of the second embodiment provides an unprecedented outstanding advantage that the control device 100A including no position sensor and providing a low level of torque pulsation and a low level of power pulsation can be made without the need for a costly microprocessor.

Third Embodiment

Figure 17:
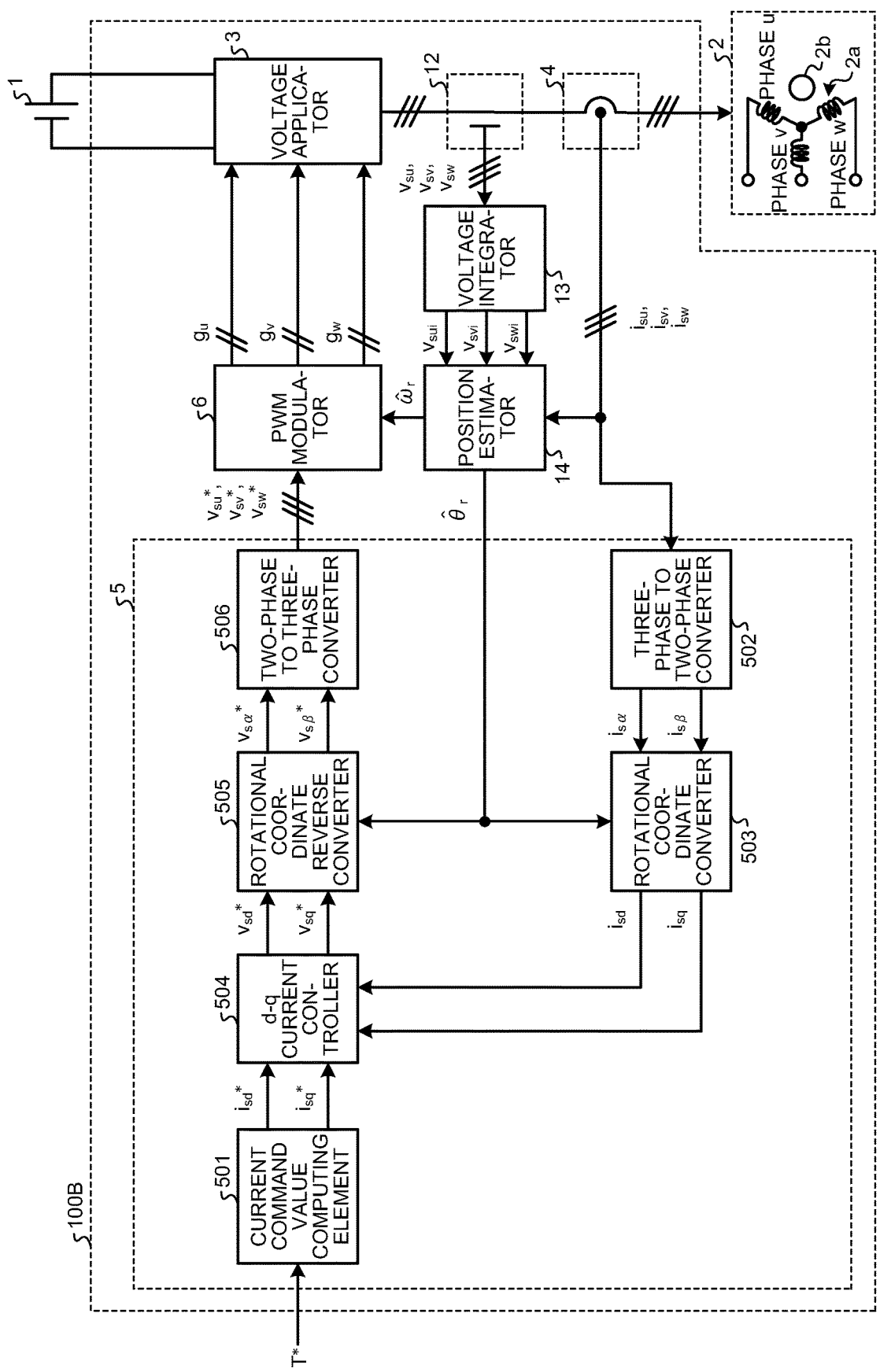
FIG. 17 is a diagram illustrating an example configuration of a rotary machine control device according to a third embodiment.

FIG. 17 is a diagram illustrating an example configuration of a rotary machine control device 100B according to a third embodiment. Comparison of the control device 100B according to the third embodiment with the control device 100 illustrated in FIG. 1 reveals that FIG. 17 replaces the voltage integrator 7 with a voltage integrator 13, and the position estimator 8 with a position estimator 14. In addition, the control device 100B further includes a voltage detector 12. The voltage detector 12 detects the stator voltage vs of a rectangular waveform applied by the voltage applicator 3 to the rotary machine 2. The other part of the configuration is the same as or equivalent to the corresponding part of the configuration of the control device 100. The same or equivalent components are designated by like reference characters, and duplicate description will be omitted.

Figure 18:
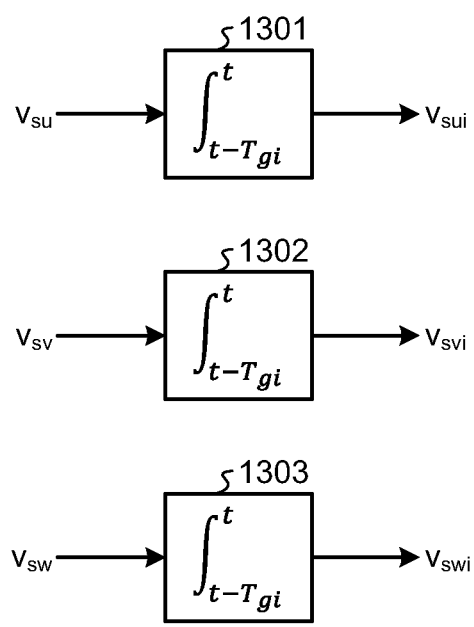
FIG. 18 is a diagram illustrating an example configuration of the voltage integrator illustrated in FIG. 17.

FIG. 18 is a diagram illustrating an example configuration of the voltage integrator 13 illustrated in FIG. 17. FIG. 18 illustrates a configuration including integrators 1301, 1302, and 1303. As one of a positive-side gate signal and a negative-side gate signal is an inverted signal of the other, FIG. 18 illustrates only components relating to the positive-side gate signals.

An operation for phase u will first be described. The phase-u voltage $v_{su}$, which is a detection value of the voltage detector 12, is input to the integrator 1301. The integrator 1301 integrates the phase-u voltage $v_{su}$. The integration time $T_{gi}$, which is the time period for performing integration, is a time period from a time earlier than the current time "t" by $T_{gi}$ to the current time "t". The integrators 1302 and 1303 perform similar operations for the other phases, i.e., for phase v and phase w. As a result, the phase-u voltage integration value $v_{sui}$ is output from the integrator 1301, the phase-v voltage integration value $v_{svi}$ is output from the integrator 1302, and the phase-w voltage integration value $v_{swi}$ is output from the integrator 1303.

As the voltage integration value is a computed integral of the instantaneous value of the stator voltage $v_s$ of a rectangular waveform, the voltage integration value $v_{sxi}$ is computed at a computation frequency set to a value sufficiently higher than the switching frequency $f_{sw}$ of the gate signal generated by the PWM modulator 6. In order that the computation frequency is sufficiently high, the computation frequency is preferably 25 or more times the switching frequency $f_{sw}$, and more preferably 100 or more times the switching frequency $f_{sw}$. In addition, a burden of this integration operation itself is small. Even with a high computation frequency, a computing device bears a small computation burden as compared to the amount of calculation necessary to control the rotary machine 2. The value of the supply voltage $v_{dc}$ for use in this operation can be a detection value, a rated value, or an expected value during use.

In the third embodiment, without using integration, the flux linkage is computed to estimate the rotor position and the rotational speed. Here, a principle for the position estimator 14 to estimate the rotor position and the rotational speed will first be described. A rotary machine model that formulates characteristics of the rotary machine 2 in the rotational coordinate system is expressed by Equations (30) and (31) below.

Formula 30

$$v_s^{dq} = R_s i_s^{dq} + \frac{d}{dt}\psi_s^{dq} + \omega_r J \psi_s^{dq} \tag{30}$$

Formula 31

$$\psi_s^{dq} = \begin{bmatrix} L_d & 0 \\ 0 & L_q \end{bmatrix} i_s^{dq} \tag{31}$$

Note that the symbol J in Equation (30) above is the transformation matrix in Equation (15) above.

In addition, since the inductance value is obtained by calculation in the third embodiment, Equation (31) above is expressed as Equation (32) below.

Formula 32

$$\psi_{s,calc}^{dq} = \begin{bmatrix} L_{sd,calc} & 0 \\ 0 & L_{sq,calc} \end{bmatrix} i_s^{dq} \tag{32}$$

In Equation (32) above, $L_{sd,calc}$ represents a d-axis inductance obtained by calculation, and $L_{sq,calc}$ represents a q-axis inductance obtained by calculation.

In addition, to calculate the induced voltage $\omega_r J \psi_s^{dq}$ that is the third term on the right-hand side of Equation (30) above, this induced voltage is denoted by $v_{emf,calc}$. In this respect, neglecting the derivative term in Equation (30) above, i.e., the second term on the right-hand side of Equation (30) above, the induced voltage $v_{emf,calc}$, which is a calculated value, can be computed using Equation (33) below from the stator voltage $v_{sdq}$ and the stator current $i_s^{dq}$.

Formula 33

$$v_{emf,calc} = v_s^{dq} - R_s i_s^{dq} \tag{33}$$

The voltage integration value $v_{sxi}$ computed by the voltage integrator 13 is used as the stator voltage $v_{sdq}$ of Equation (33) above, and a detection value is used as the stator current $i_s^{dq}$ of Equation (33). As the voltage integration value $v_{sxi}$ is an integral of the stator voltage $v_s$ of a rectangular waveform for the integration time $T_{gi}$, the voltage integration value $v_{sxi}$ is divided by Ti to thereby accurately obtain an average value of the stator voltage $v_s$ over the integration time $T_{gi}$. The third embodiment is based on the assumption that the integration time $T_{gi}$ is equal to the computation period $T_{psi2}$ of the estimated rotor position $\hat{\theta}_r$. Note that the conventional technology described in Patent Literature 1 uses the voltage command value $v_s^{dq*}$ as the stator voltage $v_s^{dq}$.

A flux linkage $\psi_{s,calc}^{dq}$ is computed using Equation (32) above. Using Equation (34) below, an estimated induced voltage $\hat{v}_{emf}$, which is an estimated value of an induced voltage $v_{emf}$, can be obtained from the thus computed flux linkage $\psi_{s,calc}^{dq}$ and the estimated rotational angular velocity $\hat{\psi}_r$.

Formula 34

$$\hat{v}_{emf} = \hat{\omega}_r J \psi_{s,calc}^{dq} \tag{34}$$

The value computed by Equation (33) above and the value estimated by Equation (34) above are compared with each other. Proportional-integral control is performed in such a manner that the difference between the values thus computed by Equations (33) and (34) converges to zero, thereby obtaining the estimated rotational angular velocity $\hat{\omega}_r$, i.e., the estimation of the rotational speed $\omega_r$, as discussed above.

In addition, the induced voltage $v_{emf,calc}$ calculated using Equation (33) above is divided by the estimated rotational angular velocity $\hat{\omega}_r$ to thereby provide a calculated value of the flux linkage $\psi_s$. This calculated value is divided by the stator current $i_s$ to thereby provide a calculated value of the inductance value.

As shown by Equation (6) above, the inductance value varies depending on the true rotor position $\theta_r$. In addition, as shown by Equation (24) above, the inductance value varies depending on the difference between the true rotor position $\theta_r$ and the estimated rotor position $\hat{\theta}_r$. Thus, checking the calculated value of the inductance value against these inductance variation characteristics enables estimating the rotor position. Specifically, the flux linkage $\psi_s^{dq}$, which includes the flux linkage inductance variable component generated by a product of the inductance variable component $L_{svar}$ and the stator current $i_s$, is divided by the stator current $i_s^{dq}$ to calculate the inductance value for obtaining the estimated rotor position $\hat{\theta}_r$ from the inductance variation characteristics dependent on the rotor position.

Figure 19:
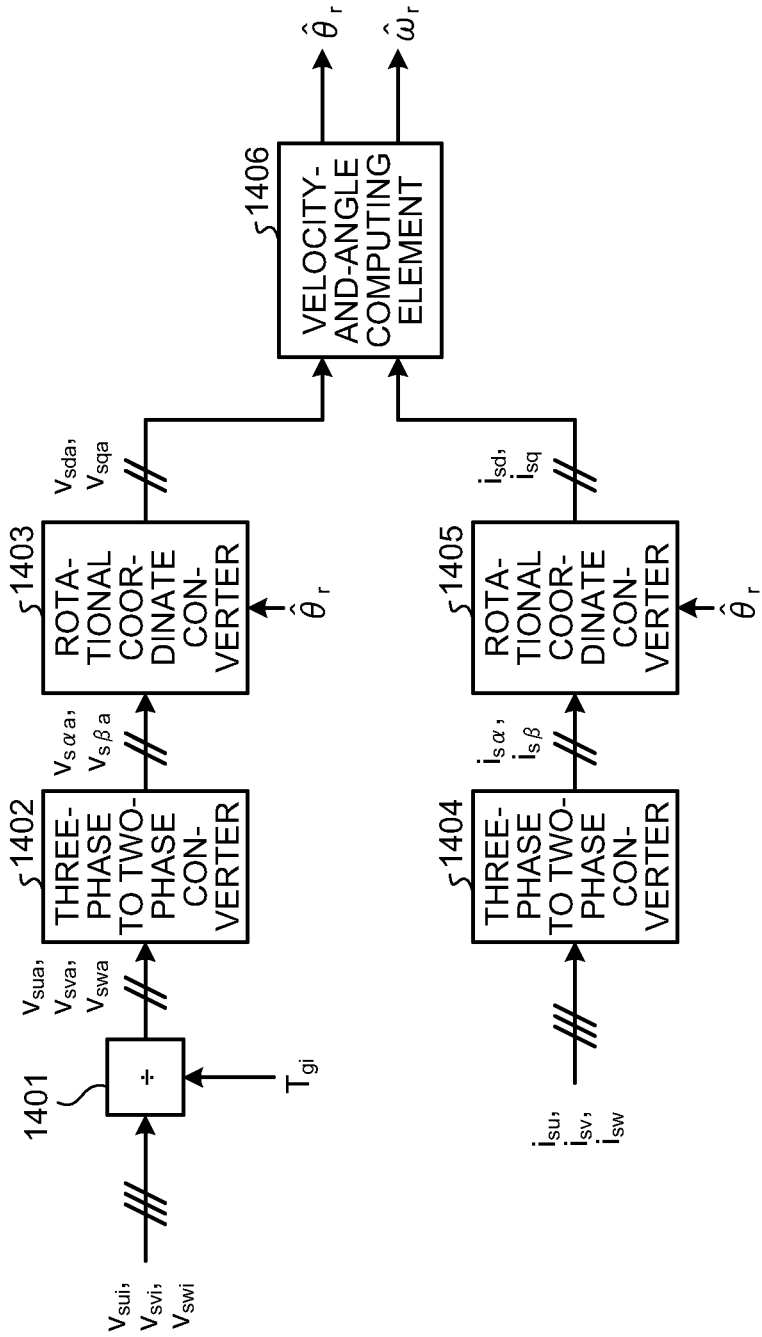
FIG. 19 is a diagram illustrating an example configuration of the position estimator illustrated in FIG. 17.

A configuration and operation of the position estimator 14 will next be described. FIG. 19 is a diagram illustrating an example configuration of the position estimator 14 illustrated in FIG. 17. The position estimator 14 can be configured to include a divider 1401, three-phase to two-phase converters 1402 and 1404, rotational coordinate converters 1403 and 1405, and a velocity-and-angle computing element 1406.

The divider 1401 divides the three-phase voltage integration values $v_{sui}$, $v_{svi}$, and $v_{swi}$ by the integration time $T_{gi}$ to thereby compute stator voltage average values $v_{sua}$, $v_{sva}$, and $v_{swa}$. The stator voltage average values $v_{sua}$, $v_{sva}$, and $v_{swa}$ are each an average value of the stator voltage $v_s$ over the integration time $T_{gi}$. The three-phase to two-phase converter 1402 converts the stator voltage average values $v_{sua}$, $v_{sva}$, and $v_{swa}$ in the three-phase coordinate system into stator voltage average values $v_{s\alpha a}$ and $v_{s\beta a}$ in the two-phase coordinate system by three-phase to two-phase conversion. The three-phase to two-phase converter 1404 converts the stator currents $i_{su}$, $i_{sv}$, and $i_{sw}$ in the three-phase coordinate system into the stator currents $i_{s\alpha}$ and $i_{s\beta}$ in the two-phase coordinate system by three-phase to two-phase conversion. The rotational coordinate converter 1403 converts the stator voltage average values $v_{s\alpha a}$ and $v_{s\beta a}$ in the two-phase coordinate system into stator voltage average values $v_{sda}$ and $v_{sqa}$ in the rotational coordinate system by rotational coordinate conversion, using the estimated rotor position $\hat{\theta}_r$. The rotational coordinate converter 1405 converts the stator currents $i_{s\alpha}$ and $i_{s\beta}$ in the two-phase coordinate system into the stator currents $i_{sd}$ and $i_{sq}$ in the rotational coordinate system by rotational coordinate conversion using the estimated rotor position $\hat{\theta}_r$. Note that the estimated rotor position $\hat{\theta}_r$, which is one of the outputs of the velocity-and-angle computing element 1406, is fed back for use. The velocity-and-angle computing element 1406 computes the estimated rotor position $\hat{\theta}_r$ and the estimated rotational angular velocity $\hat{\omega}_r$ in accordance with the foregoing description.

The technique of the third embodiment allows a longer computation period of the flux linkage than those in the case of the use of the observer and the incomplete integration because the technique of the third embodiment uses neither an observer nor incomplete integration in computing the flux linkage. This longer computation period provides a lower computation burden, thereby making it possible to use a computing device such as a less costly microprocessor. The third embodiment is based on the assumption that the control computation period $T_{psi}$ for computing the estimated rotor position $\hat{\theta}_r$ and the estimated rotational angular velocity $\hat{\omega}_r$ is equal to the integration time $T_{gi}$ for computing the voltage integration value $v_{sxi}$.

In addition, as in the first and second embodiments, the integration time $T_{gi}$ for computing the voltage integration value $v_{sxi}$ is not an integer multiple of half of the switching period $T_{sw}$. Under this condition, a conventional technology using a voltage command value $v_s^*$ causes a mismatch between the voltage command value $v_s^*$ and the value obtained by smoothing the actual voltage. As a result, the voltage command value $v_s^*$ includes an error relative to the actual voltage. An error therefore also occurs in the estimated rotor position $\hat{\theta}_r$ and the estimated rotational angular velocity $\hat{\omega}_r$ computed using these values.

In the rotary machine 2, an error in a lower frequency will cause a larger oscillating component in the magnetic flux and the torque. A near-DC component in a range from DC to a low frequency in a static coordinate system appears as an error near the fundamental wave frequency $f_s$ in the rotational coordinate system. In contrast, the position estimator 14 of the third embodiment uses the stator voltage integration value, thereby making it possible to accurately obtain an average stator voltage over the integration interval thereof, i.e., over the computation period of position estimation. This enables estimating the position, removing the pulsation of torque and power resulting from an error near the fundamental wave frequency $f_s$.

As described above, the position estimator 14 of the third embodiment, which is configured to compute the flux linkage with a small computation burden thereon without using an observer or incomplete integration, uses the voltage integration value $v_{sxi}$ to thereby estimate the position, removing the pulsation of torque and power resulting from an error near the fundamental wave frequency $f_s$. Use of the technique of the third embodiment accordingly provides an unprecedented outstanding advantage that the control device 100B including no position sensor and providing a low level of torque pulsation and a low level of power pulsation can be made without the need for a costly microprocessor.

Figure 20:
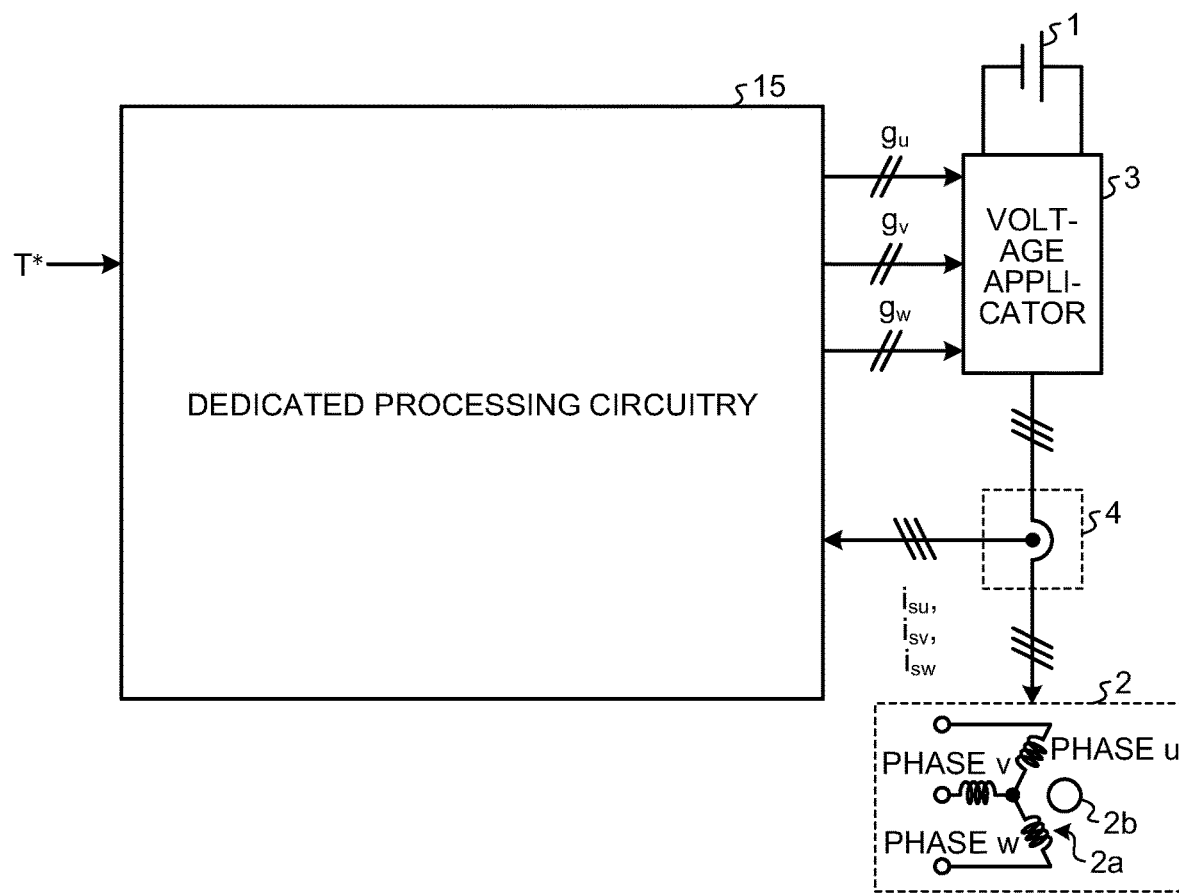
FIG. 20 is a diagram illustrating a first example hardware configuration for implementing each functionality of the control devices according to the first through third embodiments.
Figure 21:
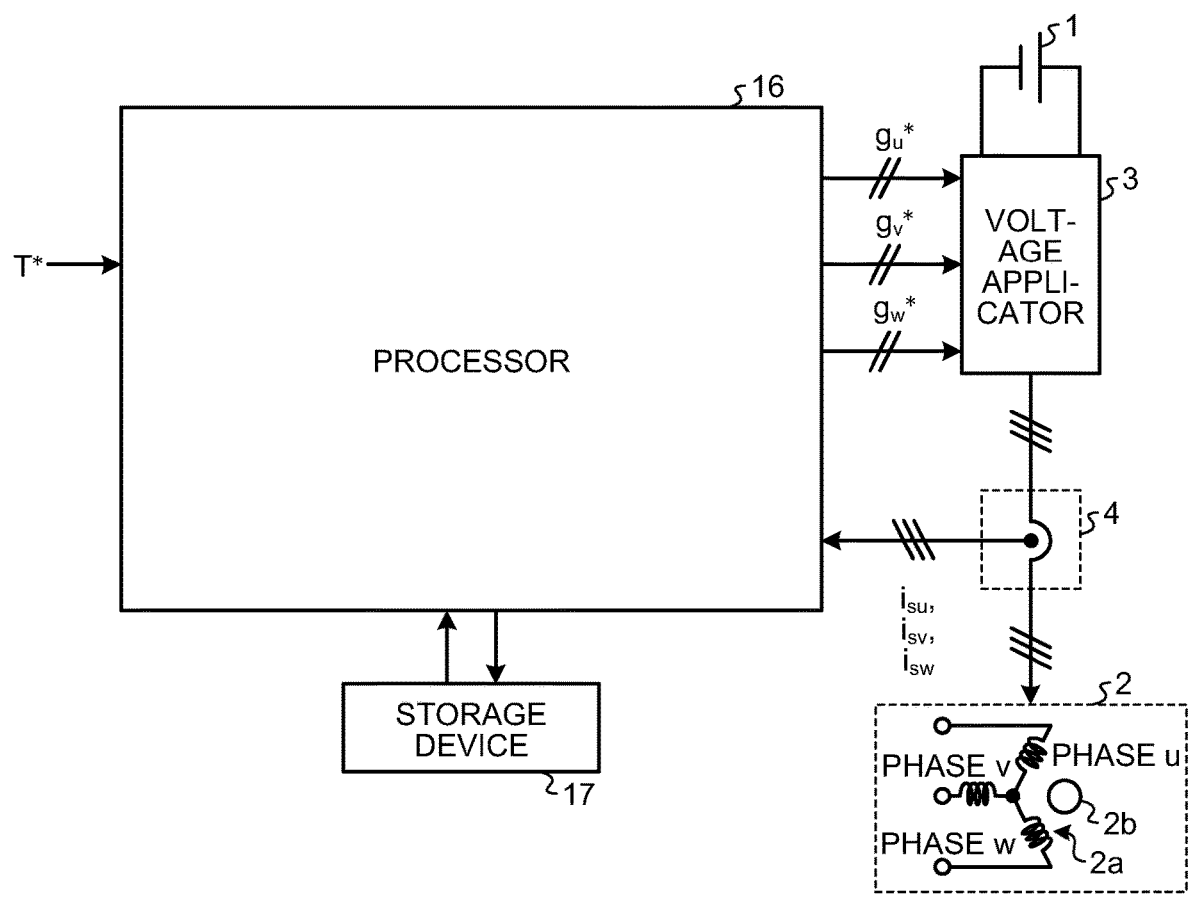
FIG. 21 is a diagram illustrating a second example hardware configuration for implementing each functionality of the control devices according to the first through third embodiments.

A configuration of hardware in the control devices 100, 100A, and 100B according to the first through third embodiments described above will next be described with reference to FIGS. 20 and 21. FIG. 20 is a diagram illustrating a first example hardware configuration for implementing each functionality of the control devices 100, 100A, and 100B according to the first through third embodiments. FIG. 21 is a diagram illustrating a second example configuration for implementing each functionality of the control devices 100, 100A, and 100B according to the first through third embodiments. Note that the term each functionality of the control devices 100, 100A, and 100B refers to the functionality of each of the controller 5, the PWM modulators 6 and 9, the voltage integrators 7, 10, and 13, and the position estimators 8, 11, and 14 included in the control devices 100, 100A, and 100B.

Each functionality of the controller 5, the PWM modulators 6 and 9, the voltage integrators 7, 10, and 13, and the position estimators 8, 11, and 14 can be implemented using a processing circuitry. FIG. 20 illustrates a dedicated processing circuitry 15, which replaces the controller 5, the PWM modulators 6 and 9, the voltage integrators 7, 10, and 13, and the position estimators 8, 11, and 14 in the first through third embodiments. When a dedicated hardware element is used, the dedicated processing circuitry 15 is a single circuit, a set of multiple circuits, an application specific integrated circuit (ASIC), a field-programmable gate array (FPGA), or a combination thereof. The functionalities of the controller 5, the PWM modulators 6 and 9, the voltage integrators 7, 10, and 13, and the position estimators 8, 11, and 14 may each be implemented in a processing circuitry, or may together be implemented in a processing circuitry.

In addition, FIG. 21 illustrates a processor 16 and a storage device 17, which together replace the controller 5, the PWM modulators 6 and 9, the voltage integrators 7, 10, and 13, and the position estimators 8, 11, and 14 in the configurations of the first through third embodiments. The processor 16 may be computing means such as a computing unit, a microprocessor, a microcomputer, a central processing unit (CPU), or a digital signal processor (DSP). In addition, examples of the storage device 17 include non-volatile and volatile semiconductor memories such as a random access memory (RAM), a read-only memory (ROM), a flash memory, an erasable programmable ROM (EPROM), and an electrically erasable programmable ROM (EEPROM) (registered trademark).

When the processor 16 and the storage device 17 are used, each functionality of the controller 5, the PWM modulators 6 and 9, the voltage integrators 7, 10, and 13, and the position estimators 8, 11, and 14 is implemented in software, firmware, or a combination thereof. The software or firmware is described in the form of programs, and is stored in the storage device 17. The processor 16 reads and executes a program stored in the storage device 17. In addition, it can also be said that these programs cause a computer to perform a procedure and a method of each functionality of the controller 5, the PWM modulators 6 and 9, the voltage integrators 7, 10, and 13, and the position estimators 8, 11, and 14. The storage device 17 may be, for example, a non-volatile or volatile semiconductor memory such as a ROM, an EPROM, or an EEPROM; a flexible disk, an optical disk, a compact disc, a digital versatile disc (DVD), or the like.

Each functionality of the controller 5, the PWM modulators 6 and 9, the voltage integrators 7, 10, and 13, and the position estimators 8, 11, and 14 may be implemented partially in hardware, and partially in software or firmware. For example, an implementation may be used in which the functionality of the PWM modulators 6 and 9 and the voltage integrators 7, 10, and 13 is implemented in a dedicated hardware element, and the functionality of the controller 5 and the position estimators 8, 11, and 14 is implemented in a combination of the processor 16 and the storage device 17.

Note that the second and third embodiments of the present description has been described in which the rotary machine 2 is a synchronous reluctance motor by way of example. However, the rotary machine 2 may be an induction motor or a permanent magnet motor. When the rotary machine 2 is an induction motor, the technique disclosed in, for example, Japanese Patent Application Laid-open No. H11-4599 can be used. Alternatively, when the rotary machine 2 is a permanent magnet motor, the technique disclosed in, for example, WO 2002/091558 A can be used. Note that the technique in the third embodiment uses, in part, the technique described in Japanese Patent Application Laid-open No. 2002-165475. Thus, refer to this patent literature for unmentioned details with respect to the third embodiment.

In addition, the present description has described the voltage applicator 3 in the context of a three-phase two-level inverter, but the voltage applicator 3 is not limited thereto. The voltage applicator 3 may be an inverter having another number of phases, or may be a multi-level inverter such as a three-level inverter or a five-level inverter. Use of any of these inverters can also provide the rotary machine control device according to the present disclosure.

Moreover, the present description has described that the switching frequency ranges from one to 15 times the fundamental wave frequency $f_s$ as an example of switching frequency. In general, when, for example, a carrier signal common to three phases is used, a switching frequency that is a multiple-of-three times (e.g., three times, six times, nine times, 12 times, and 15 times) the fundamental wave frequency $f_s$ is used in addition to a switching frequency equal to the fundamental wave frequency $f_s$. Meanwhile, when a fixed switching pattern is used without using a carrier signal, any integer multiple may be used.

Furthermore, the present description has described that the stator current for the torque of the rotary machine 2 is set to minimize the current RMS value, but the stator current is not limited thereto. The stator current for the torque of the rotary machine 2 may be set to minimize the flux linkage or to maximize the efficiency of the voltage applicator 3 or of the rotary machine 2.

The configurations described in the foregoing embodiments are merely examples. These configurations may be combined with a known other technology, and configurations of different embodiments may be combined together. Moreover, part of such configurations may be omitted and/or modified without departing from the spirit thereof.

REFERENCE SIGNS LIST

1 DC power supply; 2 rotary machine; 2a stator; 2b rotor; 3 voltage applicator; 4 current detector; 5 controller; 6, 9 PWM modulator; 7, 10, 13 voltage integrator; 8, 11, 14 position estimator; 12 voltage detector; 15 dedicated processing circuitry; 16 processor; 17 storage device; 31-36 switching element; 100, 100A, 100B control device; 501 current command value computing element; 502, 801, 803, 1101, 1102, 1402, 1404 three-phase to two-phase converter; 503, 802, 804, 1103, 1403, 1405 rotational coordinate converter; 504 d-q current controller; 505 rotational coordinate reverse converter; 506 two-phase to three-phase converter; 701, 703, 705, 1002, 1005, 1008, 1301, 1302, 1303 integrator; 702, 704, 706, 1003, 1006, 1009 multiplier; 805 observer; 1001, 1004, 1007 LPF; 1104 first computing element; 1105 first estimator; 1106 second computing element; 1107 third computing element; 1401 divider; 1406 velocity-and-angle computing element.

The invention claimed is:

1. A rotary machine control device comprising:
a voltage applicator connected between a direct current power supply and a rotary machine to apply a stator voltage of a rectangular waveform to the rotary machine by switching on and off a plurality of switching elements provided for each phase;
a current detector to detect a stator current flowing between the voltage applicator and a stator winding of the rotary machine;
a controller to compute a voltage command value on the basis of the stator current and a rotor position, the voltage command value being a command value of the stator voltage, the stator voltage being a voltage applied to the stator winding, the rotor position being information on a position of a rotor of the rotary machine;
a pulse width modulator to generate a gate signal such that a value obtained by smoothing the stator voltage matches the voltage command value, and to use the gate signal to control turning on and off each of the switching elements;

a voltage integrator to compute a voltage integration value by integrating the gate signal, the voltage integration value being an integrated value of the stator voltage; and a position estimator to estimate the rotor position on the basis of the voltage integration value and the stator current.

2. The rotary machine control device according to claim 1, comprising:

a voltage detector to detect the stator voltage, wherein the voltage integrator computes the voltage integration value by integrating a detection value of the stator voltage detected by the voltage detector, instead of integrating the gate signal.

3. The rotary machine control device according to claim 1, wherein an estimated value of the rotor position is computed on the basis of a flux linkage of the rotary machine, and the flux linkage is computed using the voltage integration value.

4. The rotary machine control device according to claim 3, wherein a computation period for which the flux linkage is computed is not an integer multiple of half of a switching period, the switching period being a reciprocal of a switching frequency of switching on and off each of the switching elements.

5. The rotary machine control device according to claim 1, wherein an estimated value of the rotor position is computed on the basis of a flux linkage of the rotary machine, and the flux linkage is computed using the voltage integration value in a static coordinate system.

6. The rotary machine control device according to claim 1, wherein the pulse width modulator synchronizes a switching frequency of switching on and off each of the switching elements with an integer multiple of a fundamental wave frequency of a rotational speed of the rotary machine.

7. The rotary machine control device according to claim 1, wherein the pulse width modulator switches a switching frequency of switching on and off each of the switching elements, depending on a fundamental wave frequency of a rotational speed of the rotary machine or depending on an amplitude of the voltage command value.

8. The rotary machine control device according to claim 1, wherein a computation period for which the rotor position is estimated is not an integer multiple of half of a switching period, the switching period being a reciprocal of a switching frequency of switching on and off each of the switching elements.

9. The rotary machine control device according to claim 8, wherein a computation frequency is 25 or more times the switching frequency, the computation frequency being a frequency at which the voltage integration value is computed.

10. The rotary machine control device according to claim 1, wherein the voltage integration value is computed after the gate signal or a detection value of the stator voltage passes through a low-pass filter.

11. The rotary machine control device according to claim 1, wherein the rotary machine has inductance including an inductance variable component that varies with the rotor position, and the position estimator estimates the rotor position on the basis of a flux linkage inductance variable component generated by a product of the inductance variable component and the stator current.

12. The rotary machine control device according to claim 11, wherein the inductance of the rotary machine includes an averaged component and a variable component, the averaged component being invariable regardless of the rotor position, the variable component varying at a frequency twice an electrical angle frequency of the rotor position, and the flux linkage inductance variable component is generated by a product of the variable component and the stator current.

* * * * *